(12) United States Patent
Oh et al.

(10) Patent No.: US 7,547,351 B2
(45) Date of Patent: Jun. 16, 2009

(54) MULTI CYCLONE DUST COLLECTOR FOR A VACUUM CLEANER

(75) Inventors: Jang-keun Oh, Gwangju (KR); Jung-gyun Han, Gwangju (KR); Tak-soo Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 602 days.

(21) Appl. No.: 11/411,768

(22) Filed: Apr. 26, 2006

(65) Prior Publication Data

US 2007/0079585 A1   Apr. 12, 2007

Related U.S. Application Data

(60) Provisional application No. 60/725,609, filed on Oct. 11, 2005.

(30) Foreign Application Priority Data

Oct. 28, 2005  (KR) ...................... 10-2005-0102615
Feb. 7, 2006   (KR) ...................... 10-2006-0011668

(51) Int. Cl.
   *B01D 45/12* (2006.01)
(52) U.S. Cl. .............................. 95/271; 55/343; 55/348; 55/424; 55/429; 55/DIG. 3; 15/350; 15/353
(58) Field of Classification Search .................. 95/271; 55/343, 346, 348, 424, 429, 459.1, DIG. 3; 15/350, 353
   See application file for complete search history.

(56) References Cited

U.S. PATENT DOCUMENTS 4,373,228 A   2/1983   Dyson ..................... 15/350

2002/0116907 A1   8/2002   Gammack et al. ............. 55/345
2005/0050863 A1   3/2005   Oh .............................. 55/345
2007/0079584 A1*  4/2007   Kim et al. .................... 55/345

FOREIGN PATENT DOCUMENTS

| CN | 1654002 | 8/2005 |
|---|---|---|
| DE | 102004034015 | 9/2005 |
| EP | 0018197 | 10/1980 |
| EP | 1371318 | 12/2003 |
| FR | 2778546 | 11/1999 |
| JP | 08-322768 | 12/1996 |
| WO | WO 01/95780 | 12/2001 |

OTHER PUBLICATIONS

Office Action dated Oct. 17, 2008 corresponding to Chinese Patent Application No. 200610092253.1.
Search Report dated Nov. 8, 2007 corresponding to European Patent Application No. 06291062.5.
Office Action dated Jul. 3, 2007 from corresponding Russian patent Application No. 2006120286.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

A multi-cyclone dust collector including at least one first cyclone forcing contaminants-laden air that is entered into a lower portion of the at least one first cyclone to whirl so as to centrifugally separate contaminants from the contaminants-laden air; and at least one second cyclone being disposed around the at least one first cyclone, the at least one second cyclone forcing semi-clean air that is discharged from the at least one first cyclone and is entered into a lower portion of the at least one second cyclone to whirl so as to centrifugally separate fine contaminants from the air.

44 Claims, 13 Drawing Sheets

MULTI CYCLONE DUST COLLECTOR FOR A VACUUM CLEANER

CROSS-REFERENCE TO RELATED APPLICATIONS

This application claims the benefit under 35 U.S.C. § 119 (a) of U.S provisional application No. 60/725,609, filed Oct. 11, 2005, in the United States Patent & Trademark Office, and claims the benefit of Korean Patent Application No. 2005-102615, filed Oct. 28, 2005, and No. 2006-11668, filed Feb. 7, 2006, in the Korean Intellectual Property Office, the disclosure of each of the above-listed applications are incorporated herein by reference.

BACKGROUND OF THE INVENTION

1. Field of the Invention

The present invention relates to a vacuum cleaner. More particularly, the present invention relates to a multi-cyclone dust collector for a vacuum cleaner that separates and collects contaminants from sucked air by centrifugal force.

2. Description of the Related Art

A cyclone type vacuum cleaner, which separates contaminants from sucked air by centrifugal force, employs a cyclone dust collector providing semi permanent use. Because a cyclone type vacuum cleaner is more sanitary and convenient than a vacuum cleaner employing a dust bag or a dust filter, cyclone type vacuum cleaners have become widespread.

An example of a conventional cyclone dust collector is shown in FIG. 1. Referring to FIG. 1, the conventional cyclone dust collector 500 includes a cylindrical cyclone body 510 in which sucked air containing contaminants forms a whirling current therein, an air inlet 520 through which the air containing contaminants enters, and an air outlet 530 through which clean air is discharged. The air inlet 520 is disposed at a side of an upper portion of the cyclone body 510 in a tangential direction relative to the cyclone body 510 so that the air entering the cyclone body 510 whirls downward easily. The air outlet 530 is disposed at a center of a top surface of the cyclone body 510 so that the air, which has contaminants removed as the air whirls downwardly, then rises up inside the cyclone body 510, and is discharged out of the cyclone dust collector 500. Separated contaminants are discharged in the gravity direction through a contaminants outlet 540 that is formed at a lower portion of the cyclone body 510.

However, in the conventional cyclone dust collector 500, the air whirling downwardly collides with the air rising up inside the cyclone body 510 because both the air inlet 520 and the air outlet 530 are disposed at the upper portion of the cyclone body 510. Accordingly, the conventional cyclone dust collector 500 has a problem that a dust collecting efficiency thereof is decreased due to collision between the rising air and the descending air.

Currently, a multi-cyclone dust collector has been developed and has become widespread. The multi-cyclone dust collector separates contaminants from air in two or more stages, and especially provides a plurality of cyclones for separating fine contaminants. An example of a conventional multi-cyclone dust collector 600 is shown in FIG. 2.

Referring to FIG. 2, the conventional multi-cyclone dust collector 600 includes a first cyclone 610 that centrifugally separates contaminants from sucked air, and a plurality of second cyclones 620 that sucks the air being discharged from the first cyclone 610, and then, separates fine contaminants remaining in the air. First and second air inlets 611 and 621 through which air is sucked into the first and second cyclone 610 and 620, and first and second air outlets 612 and 622 through which air having contaminants removed is discharged are disposed at upper portions of the first and second cyclones 610 and 620. Accordingly, air having contaminants removed is discharged in a direction opposite to the gravity direction. Also, first and second dust receptacles 613 and 623 are formed under the first and second cyclones 610 and 620. Therefore, contaminants that are separated in the first and second cyclones 610 and 620 are discharged in the gravity direction, and then are collected in the first and second receptacles 613 and 623, respectively.

Because the first and second receptacles 613 and 623 are not isolated from the first and second cyclones 610 and 620 in which air forms whirling currents, contaminants that are collected in the first and second receptacles 613 and 623 are re-scattered and flow back due to the whirling current. The backflow of contaminants decreases the dust collecting efficiency of the cyclone dust collector 600 and shortens the filter maintenance cycle of the cyclone dust collector 600.

Furthermore, the multi-cyclone dust collector 600 still has the problem that air collision occurs so as to decrease the dust collecting efficiency as described above, because the air inlets 611 and 621 and the air outlets 612 and 622 are disposed at the upper portions of the first and second cyclones 610 and 620.

Furthermore, the conventional multi-cyclone dust collector 600 has a drawback that the height thereof is high, because the space in which the air whirls and the space in which contaminants are collected are arranged vertically.

Accordingly, there is a need for an improved multi-cyclone dust collector the height of which is lower and is more compact as compared of the conventional multi-cyclone dust collector.

SUMMARY OF THE INVENTION

The present invention has been developed in order to overcome the above drawbacks and other problems associated with the conventional arrangement. An object of the present invention is to provide a multi-cyclone dust collector for a vacuum cleaner that has a high dust collecting efficiency because air collision does not occur inside a cyclone.

Another object of the present invention is to provide a multi-cyclone dust collector that has a high dust collecting efficiency and a long filter maintenance cycle because collected contaminants are not re-scattered.

Still another object of the present invention is to provide a compact multi-cyclone dust collector having a space in which contaminants are collected disposed at a side of a space in which air whirls.

Yet another object of the present invention is to provide a multi-cyclone dust collector for a vacuum cleaner having a configuration where a volume of a first dust collecting chamber is larger than a volume of a second dust collecting chamber.

The above objects and/or other features of the present invention can substantially be achieved by providing a multi-cyclone dust collector for a vacuum cleaner, which includes at least one first cyclone forcing outside air that is entered into a lower portion of the at least one first cyclone to whirl so as to centrifugally separate contaminants from the outside air; and at least one second cyclone being disposed around the at least one first cyclone, the at least one second cyclone forcing air that is discharged from the at least one first cyclone to enter into a lower portion of the at least one second cyclone to whirl so as to centrifugally separate contaminants from the air.

The at least one second cyclone is smaller in size than the at least one first cyclone. The at least one first cyclone and the at least one second cyclone discharge air in the gravity direction. The gravity direction means the direction in which the earth's gravity operates.

Also, a place through which air is discharged from the at least one first cyclone and a second place through which air enters the at least one second cyclone are on the same plane. And the at least one first cyclone discharges the contaminants in a direction opposite to the gravity direction.

According to an embodiment of the present invention, multi-cyclone dust collector further includes a first dust collecting chamber being disposed around the at least one first cyclone, and collecting the contaminants discharged from the at least one first cyclone. The at least one second cyclone is disposed inside the first dust collecting chamber. A height of the at least one first cyclone is lower than a height of the first dust collecting chamber.

According to an embodiment of the present invention, in each of the at least one first cyclone and the at least one second cyclone, a place through which contaminants are discharged is higher than a place through which air enters. And, a place through which contaminants are discharged is higher than a place through which air is discharged.

According to an embodiment of the present invention, the at least one second cyclone discharges the contaminants in a direction opposite to the gravity direction.

According to an embodiment of the present invention, the multi-cyclone dust collector further includes a second dust collecting chamber being disposed at a side of the at least one second cyclone, and collecting the contaminants discharged from the at least one second cyclone.

According to an embodiment of the present invention, the multi-cyclone dust collector includes: a plurality of second cyclones; and a plurality of second dust collecting chambers wrapping around at least one of the second cyclones, and collecting contaminants discharged from at least one of the second cyclones.

According to an embodiment of the present invention, the second dust collecting chamber is formed to wrap around two nearby second cyclones so as to collect contaminants discharged from the two nearby second cyclones.

According to an embodiment of the present invention, the second dust collecting chamber wraps around all the plurality of second cyclones so as to collect contaminants discharged from the plurality of second cyclones.

According to an embodiment of the present invention, some part of the at least one first cyclone forms some part of the at least one second cyclone.

According to an embodiment of the present invention, the at least one second cyclone is in a substantially conical shape, and some part of the first cyclone forms a side surface of the lower portion of the at least one second cyclone.

According to another aspect of the present invention, a multi-cyclone dust collector for a vacuum cleaner includes: a first cyclone sucking outside air into a lower portion of the first cyclone, forcing the outside air to form a first upwardly whirling air current so as to centrifugally separate contaminants from the outside air; a first dust collecting chamber being disposed to wrap around some of the first cyclone, collecting the contaminants discharged from the first cyclone; and a plurality of second cyclones being disposed around the first cyclone, sucking air that is discharged from the first cyclone into a lower portion of each of the second cyclones, forcing the air to form a second upwardly whirling air current so as to centrifugally separate contaminants from the air.

According to an embodiment of the present invention, the first cyclones includes a first cyclone body having a substantially hollow cylindrical shape, forcing the entered outside air to whirl inside the first cyclone body; an air communicating member being disposed inside the first cyclone body, discharging air having contaminants removed; and an air suction pipe being disposed at a bottom surface of the first cyclone body, forcing the entered outside air to form the first upwardly whirling air current.

According to an embodiment of the present invention, the air communicating member is formed in a substantially hollow cylindrical shape, the air communicating member having an opened top end and a bottom end that is in fluid communication with a plurality of air passages corresponding to the plurality of second cyclones.

According to an embodiment of the present invention, the multi-cyclone dust collector further includes a guiding cone being disposed at a center of the bottom end of the air communicating member.

According to an embodiment of the present invention, the multi-cyclone dust collector further includes: a second dust collecting chamber being formed to wrap around all the plurality of second cyclones, and collecting the contaminants discharged from the plurality of second cyclones. At this time, the plurality of second cyclones is in contact with the first cyclone body.

According to an embodiment of the present invention, the second dust collecting chamber is formed as a space between the first cyclone body and an inner wall that wraps around all the plurality of second cyclones outside. The first dust collecting chamber is formed as a space between an outer wall wrapping entirely around the inner wall and the first cyclone body, the inner wall, and a part of the first cyclone body that is not wrapped around by the inner wall.

According to an embodiment of the present invention, the multi-cyclone dust collector further includes: each of a plurality of second dust collecting chambers being formed to wrap around at least one of the plurality of second cyclones. Gaps, through which contaminants discharged from the first cyclone can pass, are formed between the plurality of second dust collecting chambers.

According to an embodiment of the present invention, the plurality of second cyclones is spaced apart from the first cyclone body. The second dust collecting chamber is formed as a space between the plurality of second cyclones and a dust wall that wraps around all the plurality of second cyclones. The dust wall is in contact with each of the plurality of second cyclones.

According to an embodiment of the present invention, the multi-cyclone dust collector further includes: an upper cover detachably covering the top ends of the first cyclone, the first dust collecting chamber, and the second dust collecting chamber. The upper cover includes a backflow preventing dam being disposed on a bottom surface of the upper cover for preventing contaminants collected in the first dust collecting chamber from flowing back into the first cyclone body.

According to still another aspect of the present invention, the multi-cyclone dust collector for a vacuum cleaner, includes: a first cyclone forcing outside air, which is entered into a lower portion of the first cyclone, to form a first upwardly whirling air current so as to centrifugally separate contaminants from the outside air; a plurality of second cyclones being disposed around some of the first cyclone, each of the second cyclones sucking air that is discharged from the first cyclone into a lower portion of each of the second cyclones, each of the second cyclones forcing the air to form a second upwardly whirling air current so as to centrifugally separate contaminants from the air; and a first dust collecting chamber being disposed to wrap around the first cyclone and the plurality of second cyclones, collecting contaminants discharged from the first cyclone.

According to an embodiment of the present invention, the first cyclone includes a plurality of cyclones.

According to an embodiment of the present invention, each of the plurality of second cyclones includes a second cyclone body, and a top end of the second cyclone body is inclined toward the first cyclone with respect to a bottom end of the second cyclone body.

Furthermore, at least one of the second cyclones is formed such that some circumferential surface thereof is projected into the first dust collecting chamber.

According to yet another aspect of the present invention, a multi-cyclone dust collector for a vacuum cleaner includes: at least one first cyclone sucking outside air so as to centrifugally separate contaminants from the outside air; at least one second cyclone being disposed around the at least one first cyclone, the at least one second cyclone sucking air that is discharged from the at least one first cyclone so as to centrifugally separate contaminants from the air; a second dust collecting chamber wrapping around the at least one second cyclone, so as to collect contaminants discharged from the at least one second cyclone in a direction opposite to the gravity direction; and a first dust collecting chamber wrapping around the at least one first cyclone and the second dust collecting chamber, so as to collect contaminants discharged from the at least one first cyclone.

According to an embodiment of the present invention, the at least one first cyclone forces the outside air that is sucked into a bottom surface thereof to whirl upwardly, the at least one first cyclone discharges contaminants separated from the outside air into the first dust collecting chamber through an opened top end of the at least one first cyclone, and the at least one first cyclone discharges air that has contaminants removed in the gravity direction.

According to an embodiment of the present invention, the at least one second cyclone forces air that is discharged from the at least one first cyclone and sucked into a lower portion of the at least one second cyclone to whirl upwardly, the at least one second cyclone discharges contaminants separated from the air into the second dust collecting chamber through an opened top end of the at least one second cyclone, and the at least one second cyclone discharges air that has contaminants removed in the gravity direction.

According to another aspect of the present invention, a multi-cyclone dust collector for a vacuum cleaner includes: at least one first cyclone sucking outside air so as to separate contaminants, a first dust collecting chamber collecting contaminants separated by the at least one first cyclone, at least one second cyclone centrifugally re-separating air discharged from the at least one first cyclone, and a second dust collecting chamber collecting contaminants separated by the at least one second cyclone, wherein the second dust collecting chamber wraps around some of a circumferential surface of the at least one first cyclone, and the first dust collecting chamber wraps around a circumferential surface of the second dust collecting chamber and some of the circumferential surface of the at least one first cyclone.

According to an embodiment of the present invention, the at least one first cyclone is on a center of the multi-cyclone dust collector. And, the at least one first and second cyclones discharge separated contaminants in a direction opposite to the gravity direction. Also, the at least one first and second cyclones suck air into a lower portion thereof and then discharge air through the lower portion thereof.

According to another aspect of the present invention, a method of collecting contaminants for a multi-cyclone dust collector, includes: sucking outside air into a lower portion of a first cyclone so as to form the outside air into a first upwardly whirling air current inside the first cyclone; separating contaminants from the outside air by centrifugal force so as to discharge the contaminants in a direction opposite to the gravity direction from the first cyclone; discharging air that has contaminants removed in the gravity direction from the first cyclone; sucking the air discharged from the first cyclone into a lower portion of a second cyclone so as to form the air into a second upwardly whirling air current inside the second cyclone; separating fine contaminants from the air by centrifugal force so as to discharge the fine contaminants in a direction opposite to the gravity direction from the second cyclone; and discharging air that has fine contaminants removed in the gravity direction from the second cyclone.

With the multi-cyclone dust collector for the vacuum cleaner according to embodiments of the present invention, entering air and discharging air do not collide with each other in the first and second cyclones so that a dust collecting efficiency of the multi-cyclone dust collector is increased.

Furthermore, with the multi-cyclone dust collector according to embodiments of the present invention, as sucked dust-laden air passes through the first cyclone, relatively large contaminants are separated, and then, as the air discharged from the first cyclone passes through the second cyclone, fine contaminants that remain in the air are separated. So the multi-cyclone dust collector according to the present invention has a high dust collecting efficiency for fine contaminants.

Furthermore, with the multi-cyclone dust collector according to embodiments of the present invention, the first and second cyclones, where upwardly whirling air currents are formed, are isolated from the first and second dust collecting chamber where contaminants are collected so that the multi-cyclone dust collector has a high dust collecting efficiency and a prolonged filter maintenance cycle.

The multi-cyclone dust collector according to an embodiment of the present invention, having an air communicating member, a first cyclone body, a plurality of second cyclone bodies, a first dust collecting chamber, and a second dust collecting chamber may be formed as one body by an injection molding process so that the number of parts and assembling time thereof is decreased.

Furthermore, with the multi-cyclone dust collector according to embodiments of the present invention, a dust collecting chamber is disposed at a side of a cyclone so that a compact multi-cyclone dust collector can be provided. And, a configuration where a plurality of second cyclones is disposed around a first cyclone body provides a compact multi-cyclone dust collector. This configuration can especially provide a multi-cyclone dust collector wherein the height thereof is low.

Furthermore, with the multi-cyclone dust collector according to embodiments of the present invention, a volume of a first dust collecting chamber is as large as possible because the first dust collecting chamber wraps around a second cyclone unit.

Furthermore, the multi-cyclone dust collector according to embodiments of the present invention employs a backflow preventing dam so as to prevent contaminants collected in the first dust collecting chamber from flowing back to the first cyclone body as the multi-cyclone dust collector is inclined.

Furthermore, with the multi-cyclone dust collector according to embodiments of the present invention, it is convenient for a user to see the quantity of contaminants collected in a first dust collecting chamber without opening an upper cover.

Also, it is convenient for a user to empty contaminants collected in the first and second dust collecting chambers because the user can dump out contaminants by opening the upper cover and turning the first and second dust collecting chambers upside down.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE INVENTION

Hereinafter, certain exemplary embodiments of the present invention will be described in detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description of exemplary embodiments of the present invention.

Figure 1:
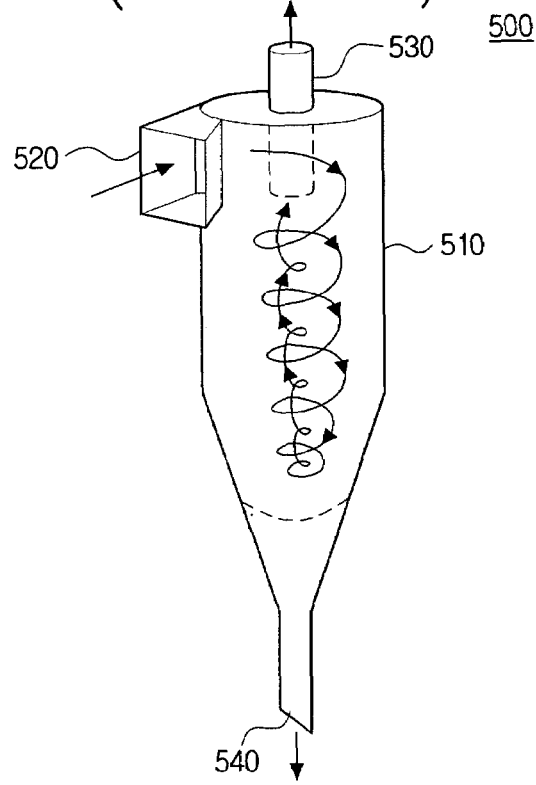
FIG. 1 is a perspective view illustrating a conventional cyclone dust collector.
Figure 2:
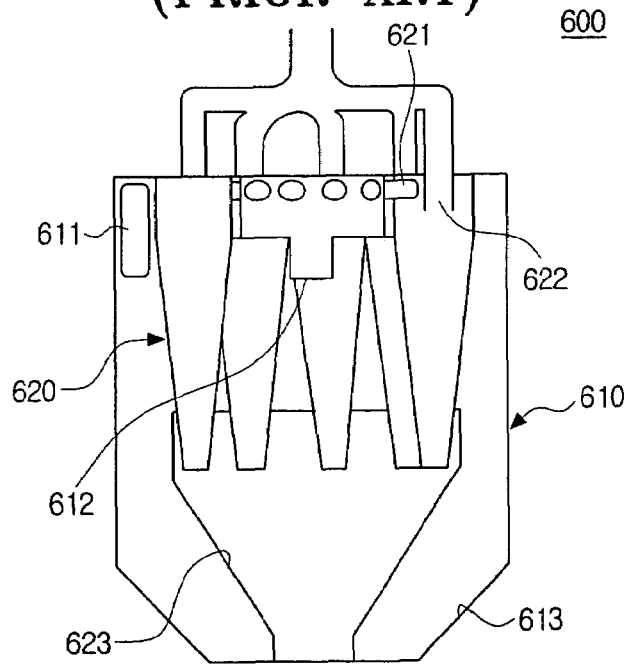
FIG. 2 is a sectional view illustrating a conventional multi-cyclone dust collector.
Figure 3:
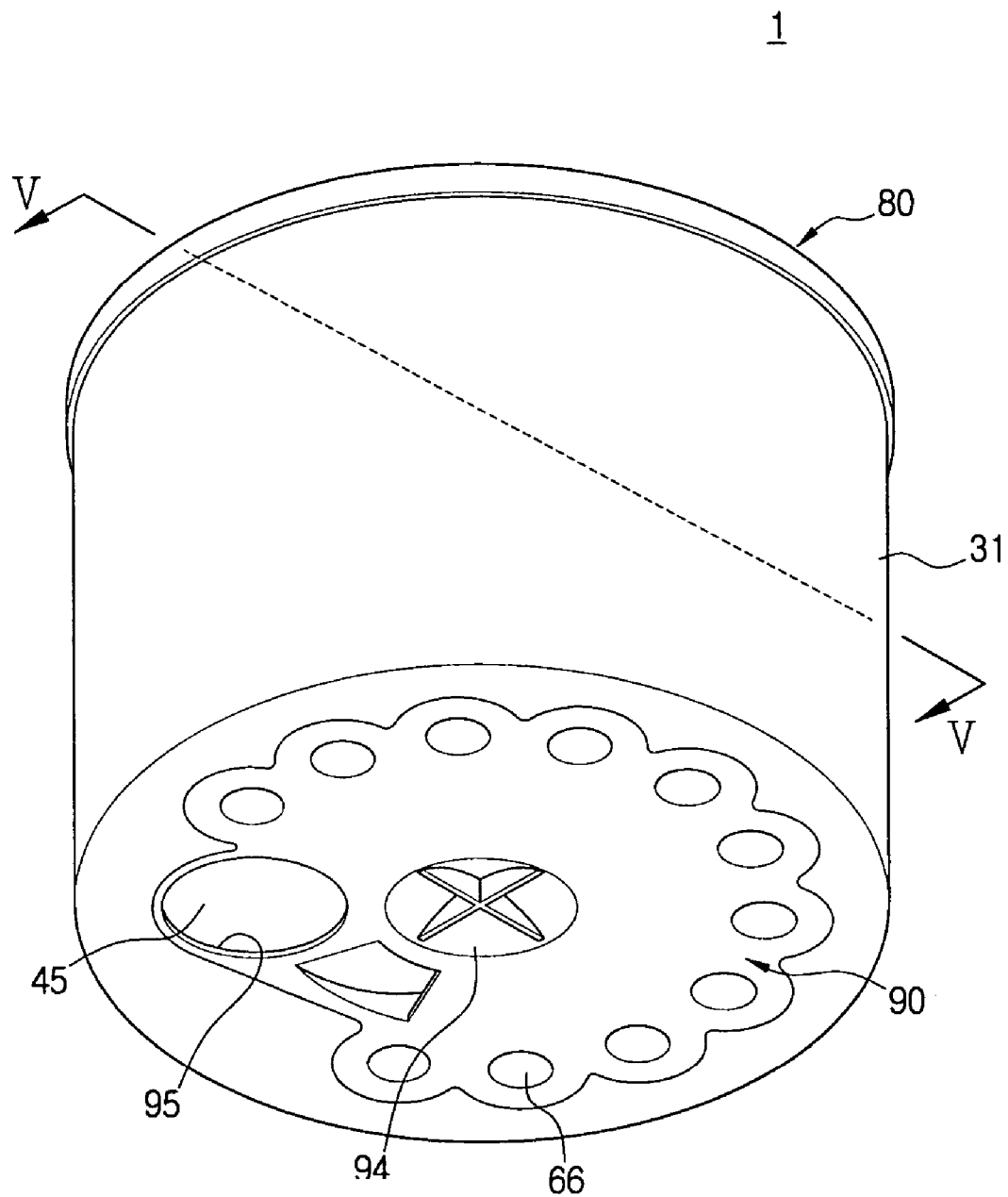
FIG. 3 is a perspective view illustrating a multi-cyclone dust collector for a vacuum cleaner according to first embodiment of the present invention.
Figure 4:
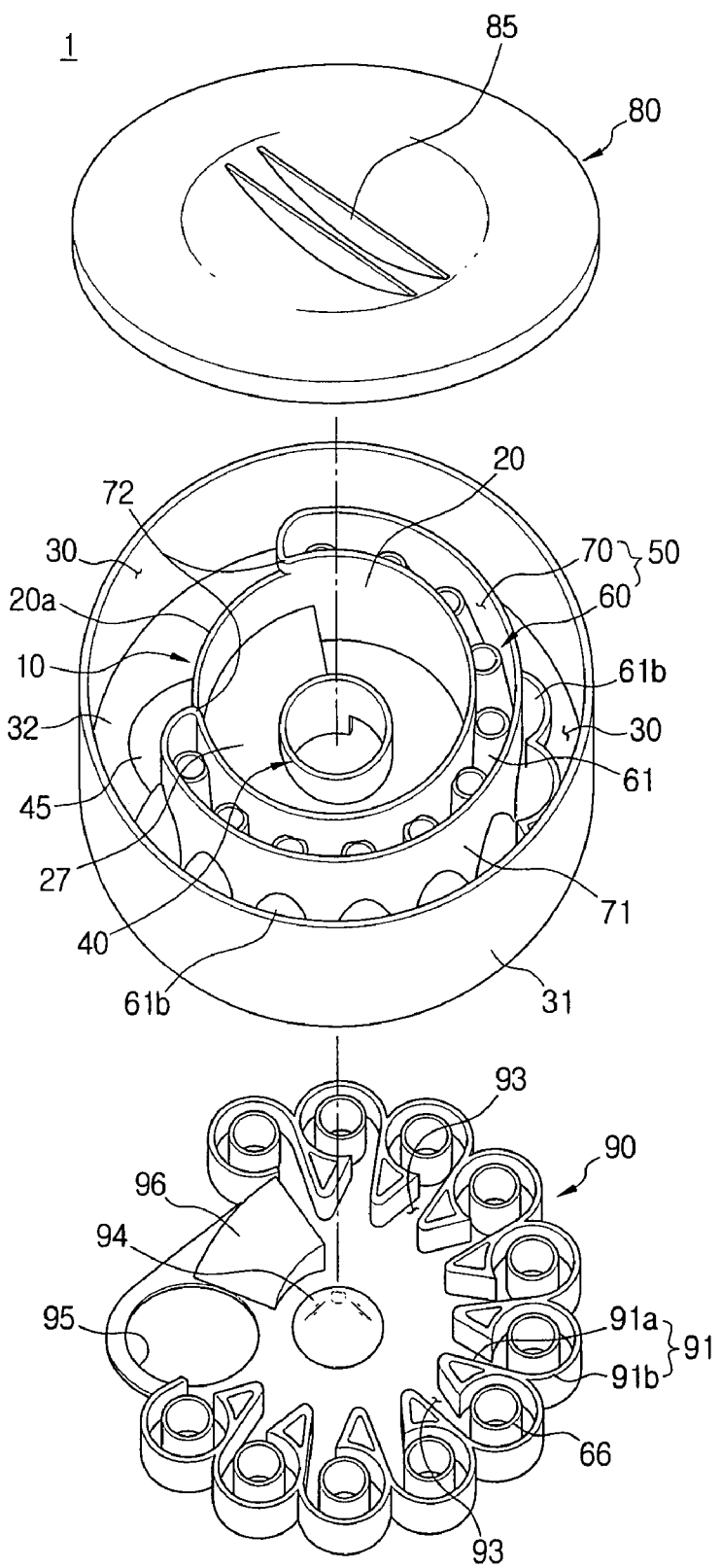
FIG. 4 is an exploded perspective view illustrating the multi-cyclone dust collector of FIG. 3.
Figure 5:
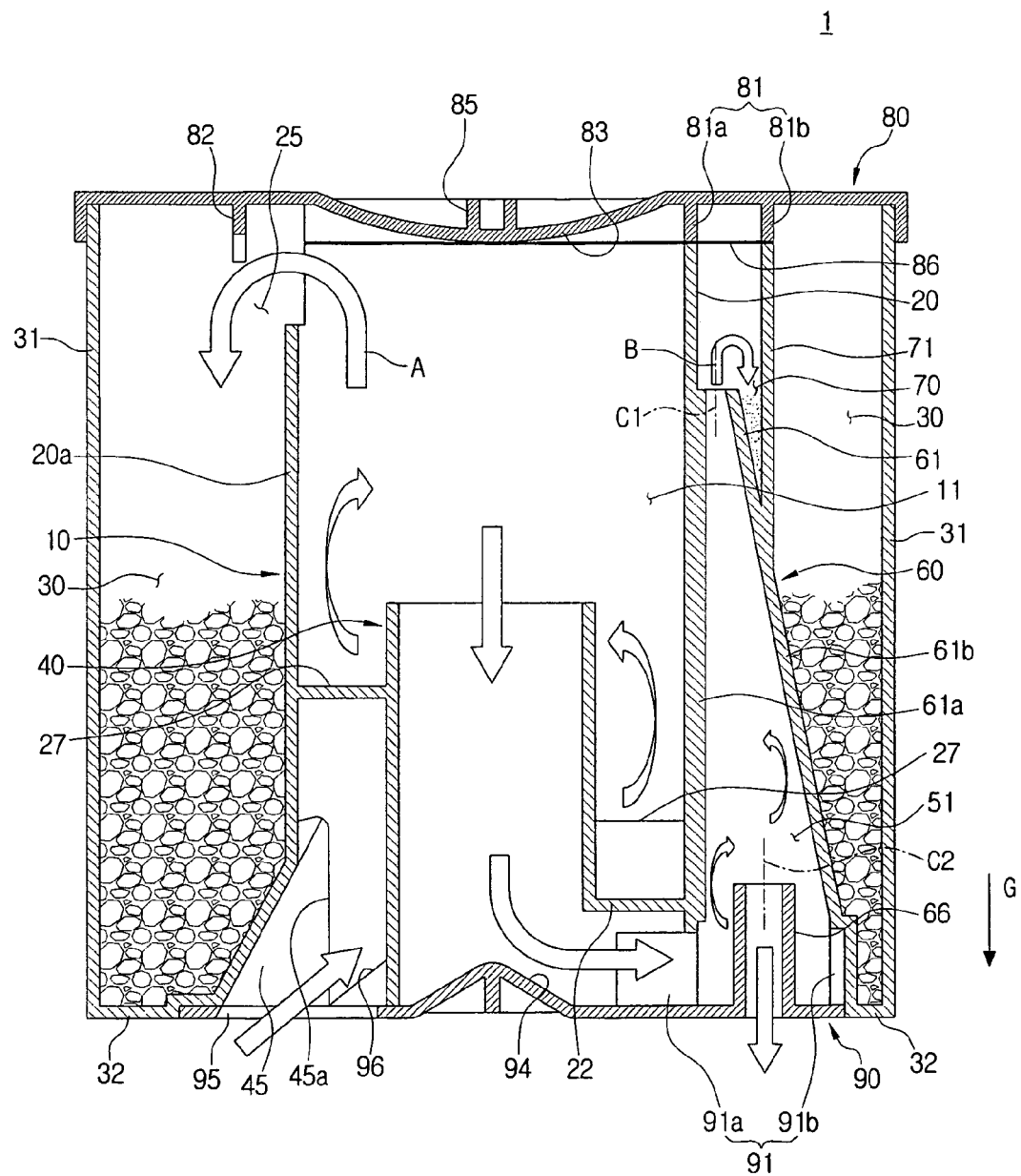
FIG. 5 is a sectional view illustrating the multi-cyclone dust collector of FIG. 3, taken along a line V-V in FIG. 3.

Referring to FIGS. 3 to 5, a multi-cyclone dust collector 1 for a vacuum cleaner according to first embodiment of the present invention includes a first cyclone 10, a first dust collecting chamber 30, and a second cyclone unit 50.

The first cyclone 10 employs at least one cyclone, and takes in air that is sucked through a suction brush 110 (see FIG. 15) and contains contaminants and dust (hereinafter, referred to as a contaminants-laden air). The first cyclone 10 forces the air to enter into a lower portion of the first cyclone 10 and to whirl upwardly so as to separate contaminants from the contaminants-laden air by centrifugal force operating upon the whirling contaminants-laden air current. In other words, the first cyclone 10 forms the contaminants-laden air entering in a direction opposite to the gravity direction (in a direction opposite to arrow G in FIG. 5) through the lower portion thereof into a first upwardly whirling air current, so that the first cyclone 10 centrifugally separates contaminants from the contaminants-laden air, and then, discharges the separated contaminants in a direction opposite to the gravity direction. Therefore, in the first cyclone 10, a place through which contaminants are discharged is higher than a place through which air, namely, the contaminants-laden air is sucked. Then, the first cyclone 10 discharges air having contaminants removed in the gravity direction (in a direction of arrow G in FIG. 5). The gravity direction means the direction in which the earth's gravity operates.

The first cyclone 10 includes a first cyclone body 20, an air communicating member 40, and an air suction pipe 45.

The first cyclone body 20 is formed in a substantially hollow cylindrical shape with a top opened end and a closed bottom end. The contaminants-laden air enters a lower portion of the first cyclone body 20 through the air suction pipe 45, and then whirls inside the first cyclone body 20 to form a first upwardly whirling air current. Accordingly, contaminants are separated from the contaminants-laden air, and then, are discharged in a direction opposite to the gravity direction by centrifugal force operating upon the first upwardly whirling air current. In other words, the separated contaminants are discharged from the first cyclone body 20 through a contaminants discharging opening 25 that is formed at the top end of the first cyclone body 20.

The air communicating member 40 discharges air, which has contaminants removed from the contaminants-laden air in the first cyclone body 20 by centrifugal force (hereinafter, referred to as a semi-clean air), into the second cyclone 60. The air communicating member 40 is formed in a substantially hollow cylindrical shape with opened opposite ends, and is projected from a center of a bottom surface 22 of the first cyclone body 20 inside the first cyclone body 20. A top end of the air communicating member 40 is separated from a contaminants guiding part 83 of an upper cover 80. A bottom end of the air communicating member 40 is in fluid communication with a plurality of air passages 93. The plurality of air passages 93 is formed on an under cover 90 that is disposed below the bottom surface 22 of the first cyclone body 20. Accordingly, the semi-clean air, which is discharged through the top end of the air communicating member 40 in the gravity direction, enters each of the plurality of second cyclones 60 through the plurality of air passages 93.

Figure 9:
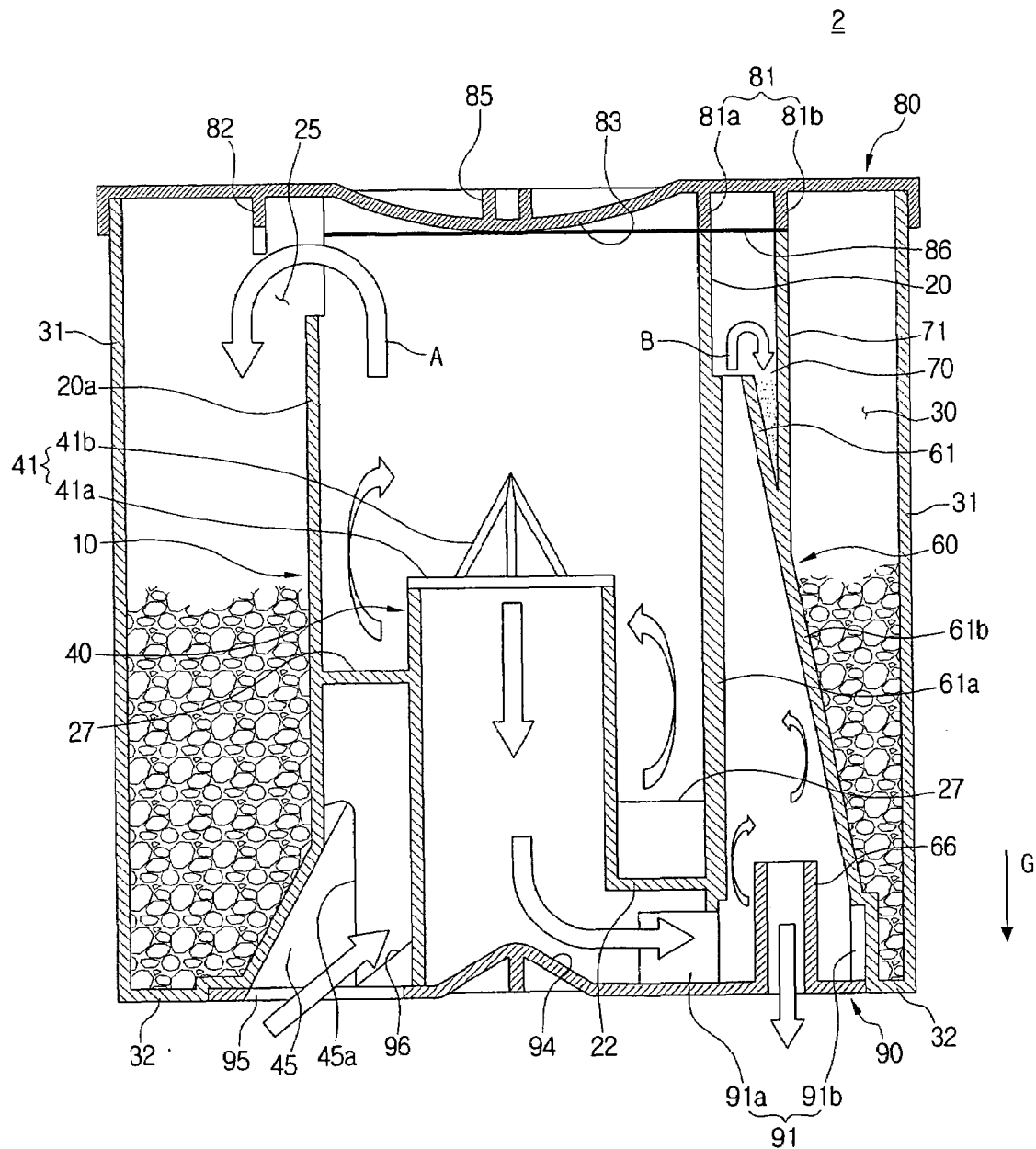
FIG. 9 is a perspective view illustrating a multi-cyclone dust collector for a vacuum cleaner according to second embodiment of the present invention.
Figure 10:
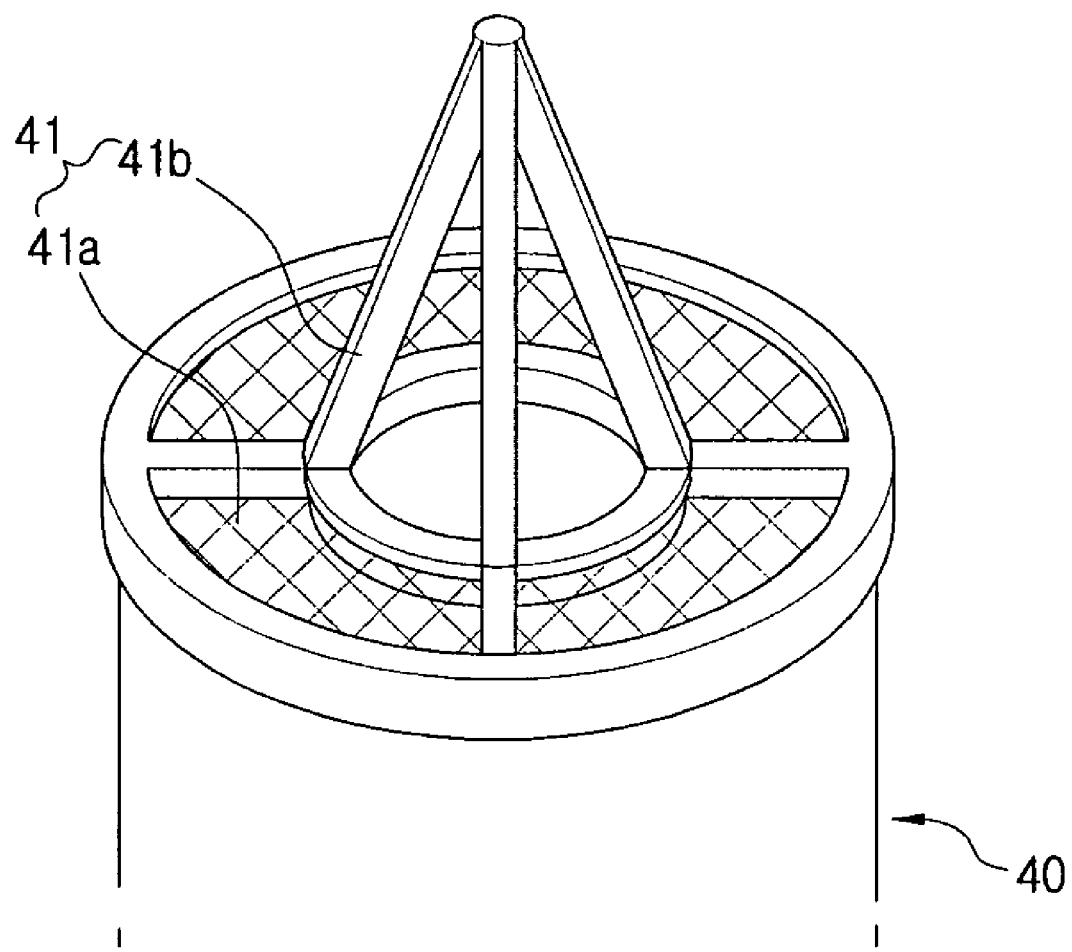
FIG. 10 is a partial perspective view illustrating a grill member of FIG. 9.

The multi-cyclone dust collector 1 according to the first embodiment of the present invention has the air communicating member 40 with the opened top end as shown in FIG. 5. However, in a multi-cyclone dust collector 2 according to second embodiment of the present invention as shown in FIG. 9, a grill member 41 is disposed at the top end of the air communicating member 40. Referring to FIGS. 9 and 10, the grill member 41 includes a grill plate 41a and a protrusion part 41b. The grill plate 41a is formed in a net shape and is disposed on the top end of the air communicating member 40. The protrusion part 41b is projected upwardly on a center of the grill plate 41a in a substantially quadrangular pyramidal shape. Accordingly, the grill member 41 may prevent relatively large contaminants from discharging to the air communicating member 40 with the semi-clean air. The protrusion part 41b prevents contaminants from blocking up the grill member 41.

The air suction pipe 45 is in fluid communication with a suction brush 110, and is disposed at the lower portion of the first cyclone body 20 so that the contaminants-laden air entering the first cyclone body 20 forms the first upwardly whirling air current. In the multi-cyclone dust collector 1 according to the present embodiment, the air suction pipe 45 is inclined upwardly through the bottom surface 22 of the first cyclone body 20. Therefore, the contaminants-laden air entered through the suction brush 45 forms the first upwardly whirling air current inside the first cyclone body 20. Also, a sloping surface 27 is formed on the bottom surface 22 of the first cyclone body 20 that is connected with the air suction pipe 45, and is inclined upwardly in a contaminants-laden air flowing direction. The sloping surface 27 assists the contaminants-laden air that enters the lower portion of the first cyclone body 20 through the air suction pipe 45 to easily form the first upwardly whirling air current. Preferably, the sloping surface 27 is formed in a substantially helical shape that extends from a bottom end of an exit 45a of the air suction pipe 45, around the air communicating member 40, and above a top end of the exit 45a of the air suction pipe 45.

In the first cyclone 10, the place through which air is sucked is the air suction pipe 45, the place through which air is discharged is the air communicating member 40, and the place through which contaminants are discharged is the contaminants discharging opening 25 of the top end of the first cyclone body 20.

The first dust collecting chamber 30 wraps around a circumferential surface of the first cyclone 10, that is, some part 20a of the first cyclone body 20, and collects contaminants that are separated in the first cyclone 10 by centrifugal force and discharged through an opened top end of the first cyclone 10. The first dust collecting chamber 30 may be formed in any shaped configurations as long as it is able to collect contaminants discharged from the top end of the first cyclone 10 in a side of the first cyclone 10. Referring to FIG. 4, the first dust collecting chamber 30 is formed as a space between a outer wall 31 that is in a substantially cylindrical shape and wraps entirely around the first cyclone body 20 and the second cyclone unit 50, a inner wall 71 wrapping around the plurality of second cyclones 60, and a part 20a of the first cyclone body 20 that is not wrapped around by the plurality of second cyclones 60. In other words, the first dust collecting chamber 30 is formed to wrap around a circumferential surface of the second dust collecting chamber 70 and some part of the circumferential surface of the first cyclone 10. Accordingly, some part of the first dust collecting chamber 30 is directly opened to the first cyclone body 20 so that the first dust collecting chamber 30 can collect contaminants discharged from the top end of the first cyclone body 20. A top end of the first dust collecting chamber 30 is closed by the upper cover 80 that covers the top end of the first cyclone body 20. A bottom end of the first dust collecting chamber 30 is closed by a bottom plate 32. Also, the outer wall 31 is preferably made of any transparent material for a user to easily perceive the amount of contaminants collected in the first dust collecting chamber 30 outside the multi-cyclone dust collector 1.

The second cyclone 60 causes the semi-clean air discharged from the first cyclone 10 to enter through a lower portion of the second cyclone 60, and then, to whirl upwardly so that the second cyclone 60 separates fine contaminants from the semi-clean air by centrifugal force and discharges the separated contaminants in a direction opposite to the gravity direction. Then, the second cyclone 60 discharges clean air in the gravity direction. Accordingly, in the second cyclone 60, a place through which contaminants are discharged is higher than a place through which the semi-clean air is sucked. At this time, the semi-clean air contains fine contaminants that have not been removed in the first cyclone 10, and the second cyclone 60 has a smaller size than the first cyclone 10 so that the second cyclone 60 can remove fine contaminants from the semi-clean air by centrifugal force. The multi-cyclone dust collector 1 according to the first embodiment of the present invention has at least one second cyclone 60 so as to remove fine contaminants.

Referring to FIGS. 4 and 5, the second cyclone unit 50 according to this embodiment includes a plurality of second cyclones 60 and a second dust collecting chamber 70.

The plurality of second cyclones 60 wraps around some part of the first cyclone 10, sucks the semi-clean air, which is discharged from the first cyclone 10 in the gravity direction, through the lower portion of each of the second cyclones 60, and then, causes the sucked semi-clean air to form a second upwardly whirling air current. The fine contaminants remaining in the semi-clean air are centrifugally separated by centrifugal force operating upon the second upwardly whirling air current. Then, the separated fine contaminants are discharged in a direction opposite to the gravity direction (in a direction opposite to arrow G). Clean air is discharged from each of the plurality of second cyclones 60 in the gravity direction (in a direction of arrow G). The plurality of second cyclones 60 wraps around some part of the first cyclone body 20 outside as shown in FIGS. 4 and 5. In the multi-cyclone dust collector 1 according to the present embodiment, 11 second cyclones 60 are disposed along the first cyclone body 20 in a substantially letter C shape. The contaminants discharging opening 25 is formed as a gap between the upper cover 80 and a top end of the part 20a of the first cyclone body 20 that is not wrapped around by the plurality of second cyclones 60. Therefore, contaminants discharged from the first cyclone body 20 are collected in the first dust collecting chamber 30 through the contaminants discharging opening 25.

Each of the plurality of second cyclones 60 has a second cyclone body 61 and an air-discharging pipe 66. The second cyclone body 61 is formed in a substantially hollow conical shape with opened opposite ends so that a diameter of the second cyclone body 61 decreases from a bottom end to a top end. Some part 61a of the second cyclone body 61 is parallel to the first cyclone body 20 and abuts on the first cyclone body 20 as shown in FIGS. 4 and 5. In the multi-cyclone dust collector 1 according to the present embodiment, some part of the first cyclone body 20 forms some part 61a of the second cyclone body 61. Furthermore, a center C1 of the top end of the second cyclone body 61 deviates from a center C2 of the bottom end thereof as shown in FIG. 5. Accordingly, the top end of the second cyclone body 61 is inclined toward the first cyclone body 20 with respect to the bottom end of the second cyclone body 61. At least one second cyclone body 61 has a lower portion 61b projecting outside the inner wall 71, that is, in the first dust collecting chamber 30. The lower portion 61b of the at least one of the second cyclone bodies 61 abuts on the lower portion 61b of the next second cyclone body 61. The plurality of second cyclone bodies 61 is lower than top ends of the inner wall 71 and the first cyclone body 20. The plurality of second cyclone bodies 61 is entirely wrapped around by the inner wall 71. A bottom end of each of the plurality of second cyclone bodies 61 is in fluid communication with the first cyclone body 20 via each of the plurality of air passages 93 that is formed by the plurality of air guiding members 91 on the under cover 90. Therefore, the semi-clean air that is discharged through the air communicating member 40 enters inside the second cyclone body 61 through the air passages 93, and then forms the second upwardly whirling air current.

The air-discharging pipe 66 is projected upwardly on a center of the bottom end of the second cyclone body 61 in a substantially hollow cylindrical shape. The air-discharging pipe 66 is in fluid communication with a vacuum generator 131 via a piping member 132 (see FIG. 15). The air-discharging pipe 66 has opened opposite ends. A top end of the air-discharging pipe 66 is lower than the top end of the second cyclone body 61. Clean air that has fine contaminants removed in the second cyclone body 61 by centrifugal force is discharged in the gravity direction through the air-discharging pipe 66. At this time, although not shown, an air gathering member may be disposed under the plurality of the air-discharging pipes 66 so that it gathers air, which is discharged from the plurality of air-discharging pipes 66, to flow to the vacuum generator 131.

In the second cyclone 60, the place through which air is sucked is the lower portion of the second cyclone body 61, the place through which air is discharged is the bottom end of the air-discharging pipe 66, and the place through which contaminants is discharged is the top end of the second cyclone body 61.

The second dust collecting chamber 70 collects contaminants that are discharged from each of the plurality of second cyclones 60 in a direction opposite to the gravity direction. The second dust collecting chamber 70 collects fine contaminants so that it has a smaller volume than the first dust collecting chamber 30 that collects relatively large contaminants. Preferably, the second dust collecting chamber 70 has the volume that is substantially simultaneously filled with fine contaminants as the first dust collecting chamber 30 is full. In another embodiment, although not shown, there is a plurality of second dust collecting chambers corresponding to the number of the second cyclones 60 so that each of the second dust collecting chambers wraps around each of the second cyclones 60. In this embodiment, the second dust collecting chamber 70 is formed by a space between the first cyclone body 20, the inner wall 71, and the plurality of second cyclone bodies 61 so that the second dust collecting chamber 70 wraps around all the plurality of second cyclones 60 as shown in FIG. 4. Accordingly, the second dust collecting chamber 70 can collect all contaminants discharged from each of the plurality of second cyclones 60. The inner wall 71 forming the circumferential surface of the second dust collecting chamber 70 wraps around the plurality of second cyclones 60 outside, and opposite side ends 72 of the inner wall 71 are connected to the first cyclone body 20 as shown in FIG. 4. Accordingly, the second dust collecting chamber 70 is configured to wrap around some part of the circumferential surface of the first cyclone 10. The part 20a of the first cyclone body 20 that is not wrapped around by the inner wall 71 forms an inner sidewall of the first dust collecting chamber 70 with the inner wall 71. Also, the bottom end of the second dust collecting chamber 70 is closed by the bottom surface 22 of the first cyclone body 20 and the plurality of second cyclone bodies 61. Therefore, contaminants that are discharged from the opened top end of each of the second cyclone bodies 61 are collected in the second dust collecting chamber 70 between the first cyclone body 20, the inner wall 71, and the plurality of second cyclone bodies 61.

Preferably, the first cyclone 10, the first dust collecting chamber 30, the plurality of second cyclones 60, and the second dust collecting chamber 70 are molded in a body as a cyclone body so that the cyclone body allows for an easy injection molding process. Having many parts molded in a body decreases the number of parts and assembly time of the multi-cyclone dust collector 1, which decreases manufacturing costs of the multi-cyclone dust collector 1.

The upper cover 80 is mounted on the top ends of the first cyclone body 20, the inner wall 71, and the outer wall 31 so that the upper cover 80 forms upper surfaces of the first cyclone body 20, the first dust collecting chamber 30, and the second dust collecting chamber 70. The gap between the top end of the first cyclone body 20 and the upper cover 80 forms the contaminants discharging opening 25 through which contaminants that are separated from the contaminants-laden air by centrifugal force are discharged to the first dust collecting chamber 30. The upper cover 80 is preferably formed to be mounted detachably/attachably with respect to the outer wall 31.

A sealing member 81 and a backflow preventing dam 82 are provided on under surface of the upper cover 80. The sealing member 81 isolates the second dust collecting chamber 70 from the first cyclone body 20 and the first dust collecting chamber 30. The sealing member 81 has a substantially letter C shape corresponding to sections of the inner wall 71 and the first cyclone body 20. The sealing member 81 includes an inner sealing part 81a contacting with the top end of the first cyclone body 20 and an outer sealing part 81b contacting with the top end of the inner wall 71. Accordingly, when the upper cover 80 is mounted on the top end of the outer wall 31, the second dust collecting chamber 70 forms an independent space that is not in fluid communication with the first cyclone 10 and the first dust collecting chamber 30. Preferably, a sealing material 86 such as rubber is attached on a bottom end of the sealing member 81 so that the second dust collecting chamber 70 is completely isolated from the first dust collecting chamber 30 and a inner space 11 of the first cyclone 10.

Figure 7:
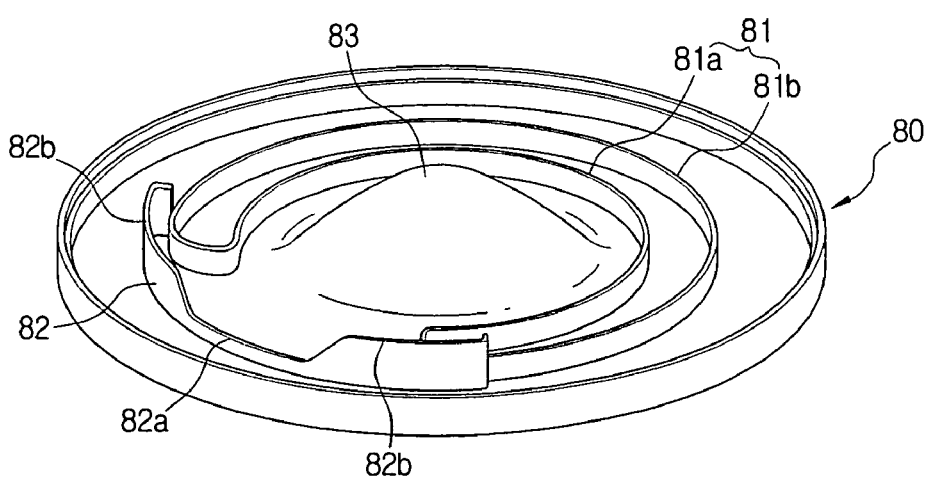
FIG. 7 is an under perspective view illustrating a top cover of FIG. 3.
Figure 8:
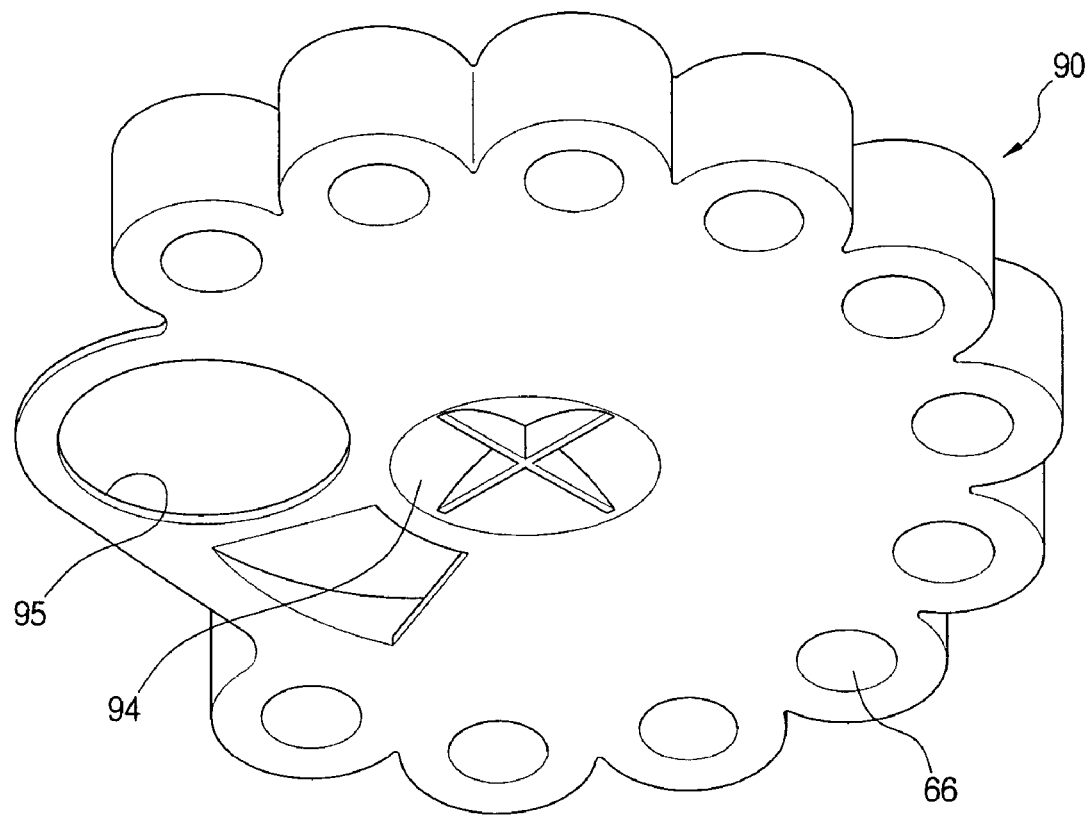
FIG. 8 is an under perspective view illustrating a bottom cover of FIG. 3.

The backflow preventing dam 82 is disposed at a side of the sealing member 81 on the upper cover 80. The backflow preventing dam 82 prevents contaminants collected in the first dust collecting chamber 30 from flowing back inside the first cyclone body 20 through the contaminants discharging opening 25 when the multi-cyclone dust collector 1 is inclined. The backflow preventing dam 82 is spaced apart from the sealing member 81 on a part of the upper cover 80 that the sealing member 81 is not disposed as shown in FIG. 7. A gap is formed between the top end of the first cyclone body 20 and the upper cover 80 so that the gap forms the contaminants discharging opening 25 described above. Accordingly, contaminants that are separated and discharged from the first cyclone body 20 by centrifugal force are collected in the first dust collecting chamber 30 through the contaminants discharging opening 25. Preferably, the backflow preventing dam 82 is configured such that a height of a center 82a thereof is lower than a height of opposite sides 82b thereof as shown in FIG. 7. The configuration of the backflow preventing dam 82 allows relatively large contaminants to be easily discharged from the first cyclone body 20 to the first dust collecting chamber 30.

Furthermore, a contaminants guiding part 83 is disposed on a center of the under surface of the upper cover 80, that is, inside the sealing member 81 and the backflow preventing dam 82 and has a substantially dome shape. The contaminants guiding part 83 assists contaminants separated from the contaminants-laden air to be discharged to the first dust collecting chamber 30 through the contaminants discharging opening 25, and assists the semi-clean air having contaminants separated to be entered into the air communicating member 40. Also, a grip 85 is preferably disposed at a center of an upper surface of the upper cover 80 as shown in FIG. 4 so that it is convenient for a user to mount or separate the upper cover 80.

Figure 6:
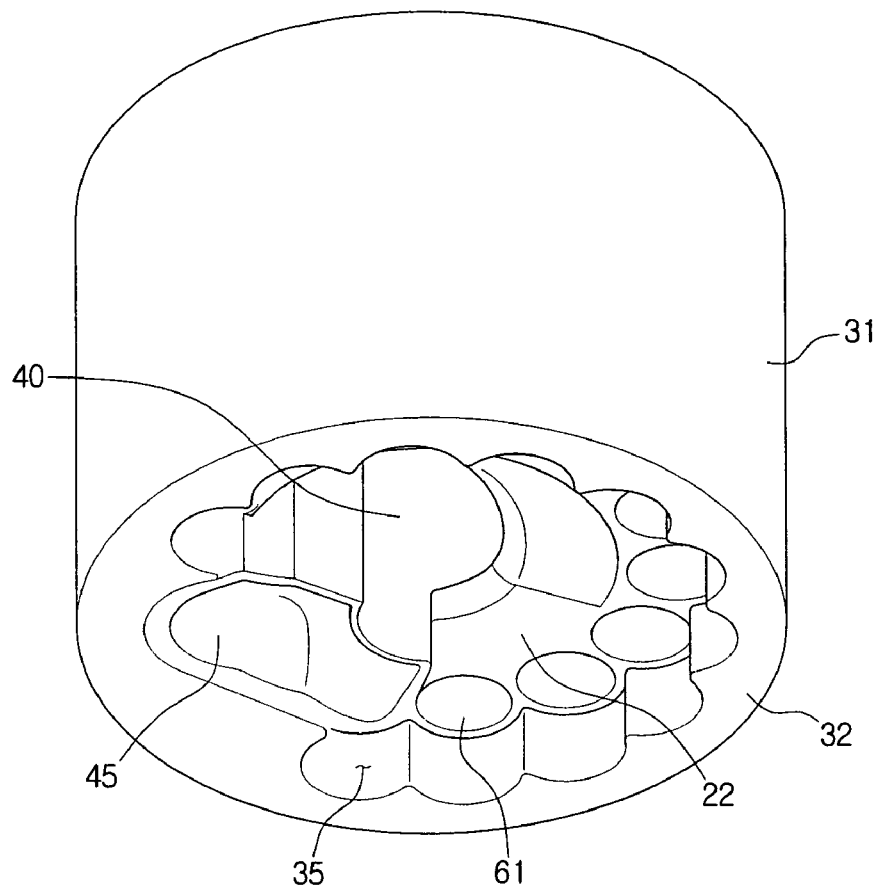
FIG. 6 is an under perspective view illustrating the multi-cyclone dust collector of FIG. 3 without a bottom cover.

The under cover 90 is disposed at a sunken space 35 formed on the bottom plate 32 as shown in FIG. 6. The under cover 90 covers the bottom surface 22 of the first cyclone body 20 and bottom ends of the plurality of second cyclone bodies 61 so that the under cover 90 forms the plurality of air passages 93 and bottom surfaces of the plurality of second cyclone bodies 61. Accordingly, a place through which air is discharged from the first cyclone 10 and a place through which the air enters the second cyclone 60 are on the same plane. Referring to FIG. 4, the plurality of air guiding members 91 and the plurality of air-discharging pipes 66 are formed on the under cover 90. Each of the plurality of air guiding members 91 includes a straight part 91a and a curved part 91b. The straight part 91 a forms the air passages 93 that distribute air discharged through the air communicating member 40 into each of the plurality of second cyclones 60. The curved part 91b corresponds to the bottom end of the second cyclone body 61 and is in fluid communication with the straight part 91a. The air-discharging pipe 66 has a substantially cylindrical shape and is formed at a center of the curved part 91b of the air guiding member 91. The plurality of air guiding members 91 and the plurality of air-discharging pipes 66 are preferably molded integrally with the under cover 90. When the under cover 90, the plurality of air guiding members 91, and air-discharging pipes 66 are molded in a body, it is convenient to form the multi-cyclone dust collector 1 by an injection molding method.

Furthermore, the under cover 90 includes a guide cone 94, an air hole 95, and a slant part 96. The guide cone 94 is formed in a substantially conical shape on a center of the under cover 90 so that it guides the semi-clean air that is discharging along the air communicating member 40 to each of the plurality of air passages 93. The air hole 95 is disposed at a part of the under cover 90 on which the plurality of air guiding members 91 is not formed so that the air hole 95 forms an entrance of the air suction pipe 45. The slant part 96 is formed at a side of the air hole 95 so that the slant part 96 is continuous with the sloping surface 27 of the bottom surface 22 of the first cyclone body 20 as the under cover 90 is mounted at the bottom surface 22 of the first cyclone body 20.

Hereinafter, operation and function of the multi-cyclone dust collector 1 according to the first embodiment of the present invention will be explained in detail by referring to FIGS. 3 to 8.

Upon turning on the vacuum cleaner, the vacuum generator 131 (see FIG. 15) operates to generate a suction force. The suction force sucks air, which contains contaminants such as dust or dirt (herein after referring to as contaminants-laden air), from a cleaning surface into the suction brush 110 (see FIG. 15). The contaminants-laden air sucked into the suction brush 110 flows to a multi-cyclone dust collector 1 in fluid communication with the suction brush 110 via a connection member 121 and 122 (see FIG. 15).

The contaminants-laden air flowing to the multi-cyclone dust collector 1 is entered into a lower portion of the first cyclone body 20 through the air suction pipe 45. The contaminants-laden air sucked into the first cyclone body 20 forms the first upwardly whirling air current that whirls upwardly inside the first cyclone body 20. At this time, the contaminants-laden air entering the lower portion of the first cyclone body 20 easily forms the first upwardly whirling air current due to the sloping surface 27 disposed before the exit 45a of the air suction pipe 45 on the bottom surface 22 of the first cyclone body 20. Then, contaminants are separated from the contaminants-laden air by the centrifugal force operating upon the first upwardly whirling air current. The separated contaminants are moved in a direction opposite to the gravity direction (in a direction opposite to arrow G), and then are discharged to the first dust collecting chamber 30 over the top end of the first cyclone body 20. In other words, the separated contaminants are discharged into the first dust collecting chamber 30 through the contaminants discharging opening 25 formed between the top end of the first cyclone body 20 and the upper cover 80 as illustrated by arrow A in FIG. 5, and then, are collected in the first dust collecting chamber 30. The first dust collecting chamber 30 is formed to wrap around the second cyclone 60 and the second dust collecting chamber 70 so that the first dust collecting chamber 30 can collect a lot of contaminants. The first dust collecting chamber 30 is partitioned by the first cyclone body 20 from the space 11 in which the first upwardly whirling air current is formed so that the first upwardly whirling air current inside the first cyclone body 20 is not affected by the contaminants collected in the first dust collecting chamber 30. Furthermore, airwhich is entered into the first cyclone body 20 and forms the first upwardly whirling air current, is directly discharged in the gravity direction (in the direction of arrow G) through the air communicating member 40 so that air collision does not occur in the first cyclone body 20. Accordingly, the dust collecting efficiency of the multi-cyclone dust collector 1 is increased. When the grill member 41 is disposed on the top end of the air communicating member 40 like the multi-cyclone dust collector 2 according to the second embodiment of the present invention as shown in FIG. 9, the grill member 41 prevents relatively large contaminants from discharging with the semi-clean air through the air communicating member 40 so that the plurality of second cyclones 60 is not blocked by the relatively large contaminants.

The semi-clean air that has contaminants removed in the first cyclone body 20 enters the top end of the air communicating member 40 and then flows to the bottom end of the air communicating member 40. In other words, the semi-clean air flows in the gravity direction (in a direction of arrow G). The semi-clean air passing through the air communicating member 40 is crashed against the guide cone 94 of the under cover 90, and then, is distributed into each of the plurality of air passages 93 that is formed by the plurality of air guiding members 91 wrapping around the guide cone 94. Then, the semi-clean air flows along the straight part 91a and the curved part 91b of the air guiding member 91 and then enter the lower portion of each of the plurality of second cyclone bodies 61.

The semi-clean air entering the lower portion of the cyclone body 61 forms the second upwardly whirling air current inside the second cyclone body 61. Then, fine contaminants are separated from the semi-clean air by the centrifugal force operating upon the second upwardly whirling air current and are discharged in a direction opposite to the gravity direction (in a direction opposite to arrow G). In other words, the separated fine contaminants are discharged over the top end of the second cyclone body 61 and then are collected in the second dust collecting chamber 70. The second dust collecting chamber 70 is partitioned by the second cyclone body 61 from the space 51 in which the second upwardly whirling air current is formed so that the contaminants collected in the second dust collecting chamber 70 are not affected by the second upwardly whirling air current inside the second cyclone body 61. Therefore, the contaminants collected in the second dust collecting chamber 70 are not re-scattered so that the maintenance cycle of a filter between the plurality of second cyclones 60 and the vacuum generator 131 is prolonged. Furthermore, air that has fine contaminants removed in the second cyclone body 61 is directly discharged in the gravity direction through the air-discharging pipe 66. Therefore, suction air that is sucked into the second cyclone body 61 does not collide with discharging air that is discharged from the second cyclone body 61 inside the second cyclone body 61 so that the dust collecting efficiency of the multi-cyclone dust collector 1 is increased.

Clean air that has fine contaminants removed whirling upwardly in the second cyclone body 61 is discharged in the gravity direction through the air-discharging pipe 66. In all the plurality of second cyclones 60, fine contaminants are removed from the semi-clean air by the same operation as described above, and clean air is discharged through the plurality of air-discharging pipes 66. Clean air discharged to the air-discharging pipes 66 passes through the vacuum generator 131 and then is discharged out of the cleaner body 130.

When the air gathering member (not shown) is disposed under the plurality of air-discharging pipes 66, clean air that is discharged from the air-discharging pipe 66 of each of the plurality of second cyclones 60 is gathered together by the air gathering member, and then is discharged to the vacuum generator 131.

A user can see the quantity of contaminants collected in the first dust collecting chamber 30 through the transparent outer wall 31 without opening the upper cover 80. The quantity of fine contaminants that is discharged from the second cyclones 60 is much smaller than the quantity of contaminants that is discharged from the first cyclone 10 so that the second dust collecting chamber 30 is not full until the first dust collecting chamber 30 is full with contaminants.

Figure 11:
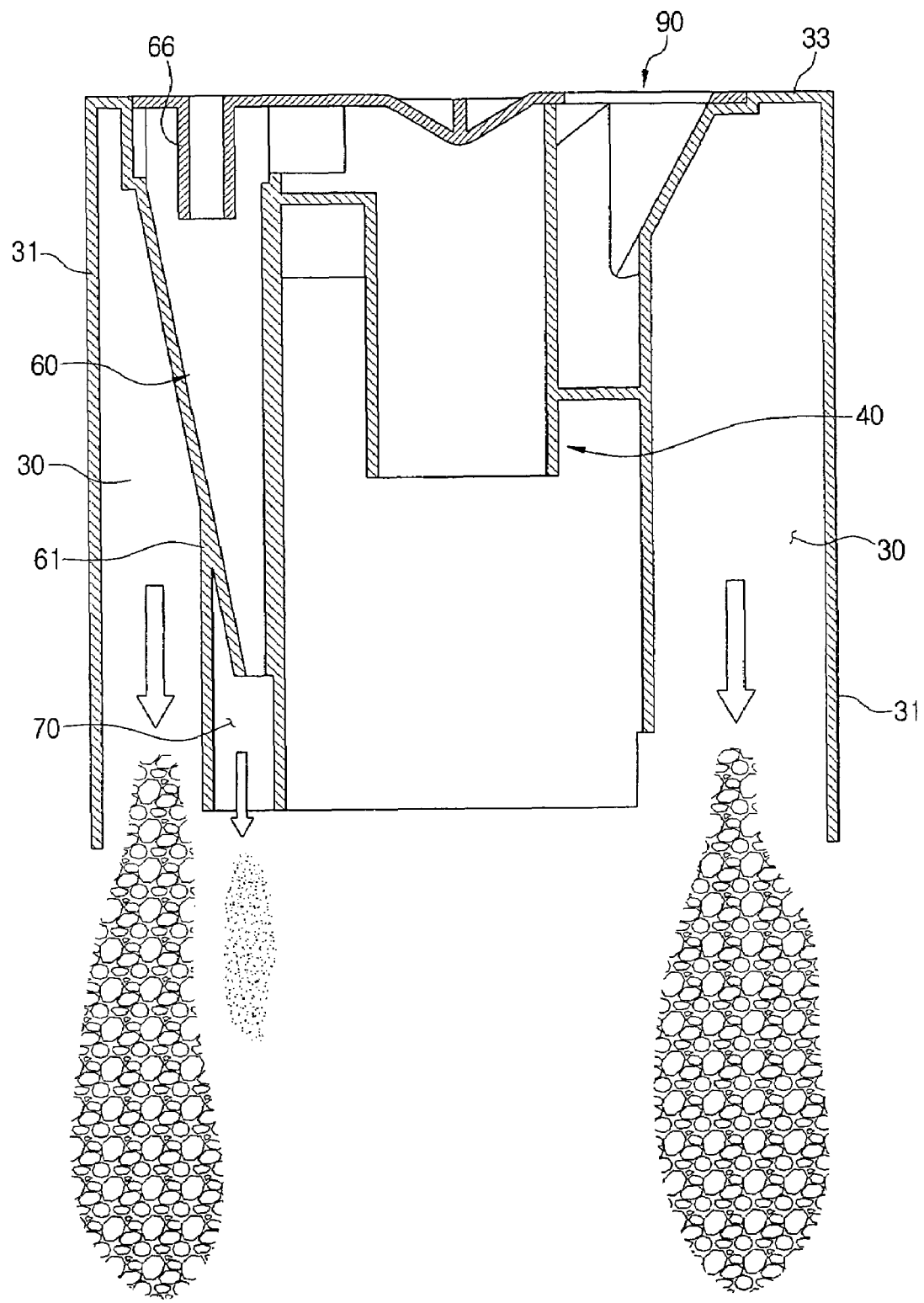
FIG. 11 is a sectional view illustrating the multi-cyclone dust collector of FIG. 3 when collected contaminants are dumped.

When emptying contaminants collected in the first dust collecting chamber 30, a user first opens the upper cover 80 covering the first dust collecting chamber 30 and the second dust collecting chamber 70. At this time, the grip 85 of the upper cover 80 provides a user convenience to open the upper cover 80. Then, by turning downward the multi-cyclone dust collector 1 as shown in FIG. 11, contaminants collected in the first dust collecting chambers 30 can be thrown away. At this time, contaminants collected in the second dust collecting chamber 70 are also thrown away. Accordingly, when a user checks out the amount of contaminants collected in the first dust collecting chamber 30 and then empties the first dust collecting chamber 30, the second dust collecting chamber 70 is emptied before being full with contaminants. Therefore, it is convenient that the multi-cyclone dust collector 1 does not require a user to additionally check out and empty the second dust collecting chamber 70. Furthermore, a structure wherein the upper cover 80 is opened to empty contaminants collected in the first and second dust collecting chambers 30 and 70 allows a user to throw contaminants away while watching the contaminants. Thus, the structure wherein the upper cover 80 is opened is more convenient to throw contaminants away than a structure wherein the under cover 90 is opened.

Furthermore, because the multi-cyclone dust collector 1 according to first embodiment of the present invention has the upper cover 80 has the backflow preventing dam 81, contaminants collected in the first dust collecting chamber 30 are less likely to flow back into the first cyclone body 20 through the contaminants discharging opening 25 as the multi-cyclone dust collector 1 is inclined.

Hereinafter, a multi-cyclone dust collector 3 for a vacuum cleaner according to third embodiment of the present invention will be explained in details referring to FIGS. 12 and 13.

Figure 12:
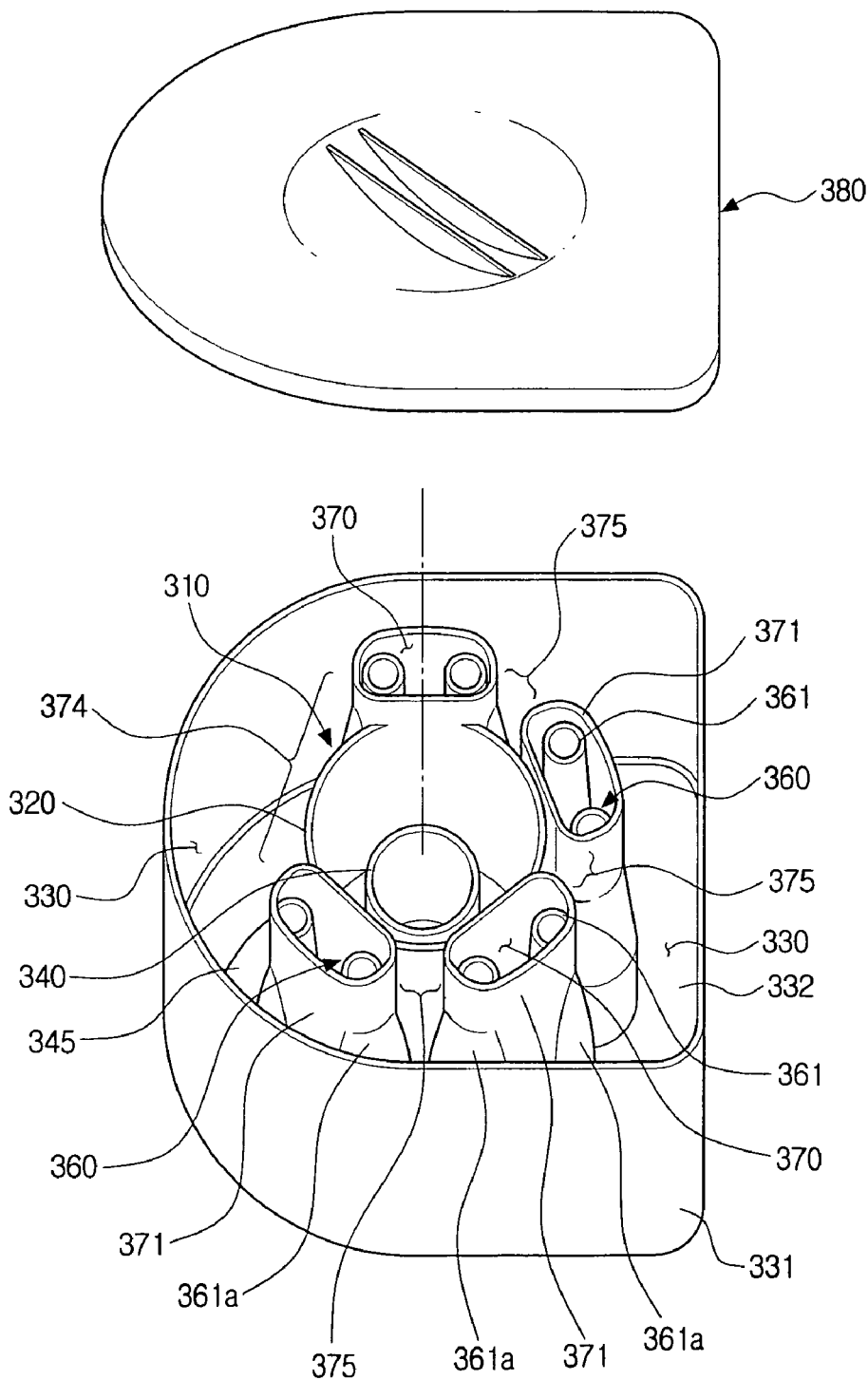
FIG. 12 is a partially exploded perspective view illustrating a multi-cyclone dust collector for a vacuum cleaner according to third embodiment of the present invention.
Figure 13:
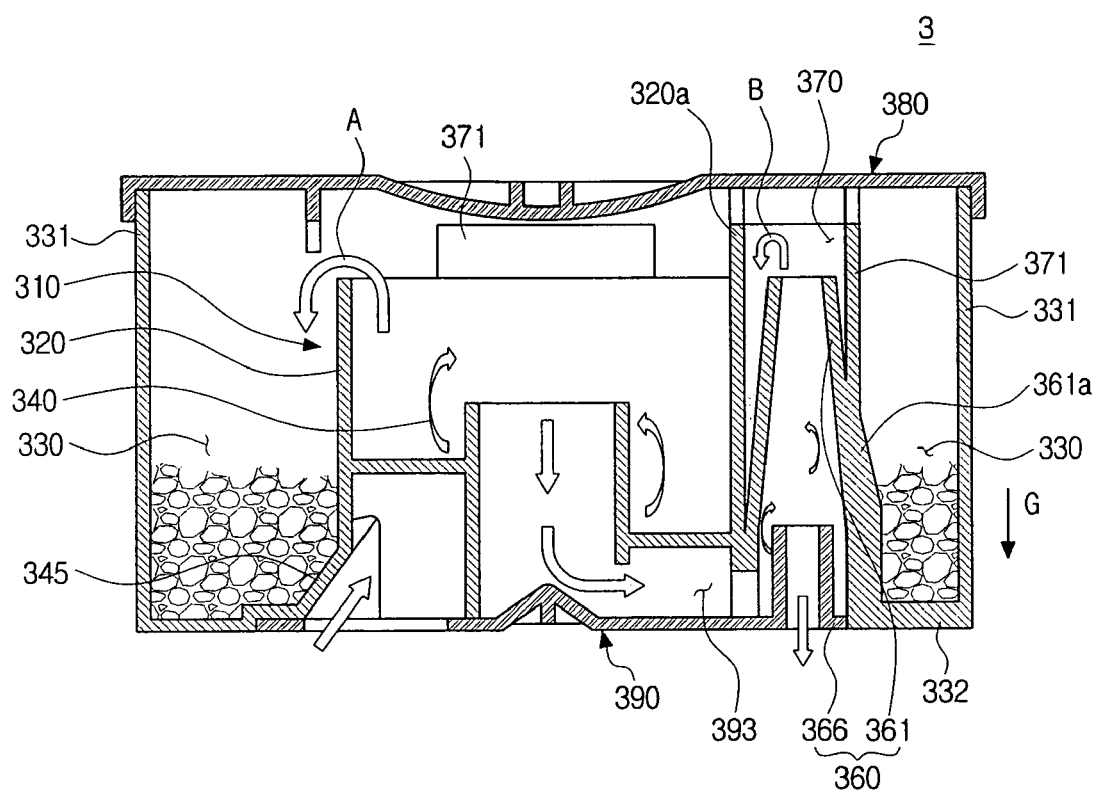
FIG. 13 is a sectional view illustrating the multi-cyclone dust collector of FIG. 12.

Referring to FIGS. 12 and 13, a multi-cyclone dust collector 3 for a vacuum cleaner according to third embodiment of the present invention includes a first cyclone 310, a first dust collecting chamber 330, a plurality of second cyclones 360, and a plurality of second dust collecting chambers 370.

The first cyclone 310 is disposed at a substantially center of the multi-cyclone dust collector 3, and sucks contaminants-laden air, which are sucked through a suction brush 110 (see FIG. 15), into a lower portion of the first cyclone 310 in a direction opposite to the gravity direction (in a direction opposite to arrow G). The first cyclone 310 forces the contaminants-laden air to whirl upwardly inside the first cyclone 310 so as to form a first upwardly whirling air current and to separate contaminants from the contaminants-laden air by centrifugal force. The separated contaminants move in a direction opposite to the gravity direction and are discharged over a top end of the first cyclone 310. The first cyclone 310 includes a first cyclone body 320, an air communicating member 340, and an air suction pipe 345. Since the structure and function of the first cyclone body 320, the air communicating member 340, and the air suction pipe 345 of the multi-cyclone dust collector 3 according to the present embodiment are the same as those of the multi-cyclone dust collector 1 according to the first embodiment of the present invention, a detail description thereof is not repeated for conciseness.

The first dust collecting chamber 330 is disposed at a side of the first cyclone 310, and collects contaminants that are separated in the first cyclone 310 by centrifugal force and are discharged through the opened top end of the first cyclone 310. The first dust collecting chamber 330 wraps entirely around the first cyclone 310, the plurality of second cyclones 360, and the plurality of second dust collecting chambers 370. In other words, the first dust collecting chamber 330 is formed as a space between an outer wall 331 that wraps around the first cyclone 310 and the plurality of second dust collecting chambers 370 at a predetermined distance, a circumferential surface of each of the plurality of second dust collecting chambers 370, and a circumferential surface of the first cyclone 310. A bottom end of the first dust collecting chamber 330 is closed by a bottom plate 332. Accordingly, the first cyclone 310, the plurality of second cyclones 360, and second dust collecting chambers 370 are disposed on a substantially center of the first dust collecting chamber 330 that is formed by the outer wall 331 and the bottom plate 332. The first dust collecting chamber 330 is opened with respect to the first cyclone body 320 at several places so that the first dust collecting chamber 330 can collect contaminants discharged over the top end of the first cyclone body 320. Here, the shape of the outer wall 331 and the bottom plate 332 of the first dust collecting chamber 330 as shown in FIG. 12 is only one example, it goes without saying that the outer wall 331 and the bottom plate 332 can be variously shaped.

The second cyclone 360 takes semi-clean air that discharged from the first cyclone 310, and forces the semi-clean air to enter into a lower portion of the second cyclone 360 and to whirl upwardly so that fine contaminants remained in the semi-clean air are separated and discharged in a direction opposite to the gravity direction (in a direction opposite to arrow G) by centrifugal force operating upon the whirling semi-clean air. Then, the second cyclone 360 discharges clean air in the gravity direction (in a direction of arrow G).

Referring to FIGS. 12 and 13, the plurality of second cyclones 360 is disposed to wrap around some part of the first cyclone 310. Each of the plurality of second cyclones 360 sucks the semi-clean air, which is discharged from the first cyclone 310 in the gravity direction, into the lower portion of the second cyclone 360, and then, forms the sucked semi-clean air into a second upwardly whirling air current. Fine contaminants remained in the semi-clean air are separated and discharged in a direction opposite to the gravity direction by centrifugal force operating upon the second upwardly whirling air current. Clean air is discharged from the second cyclone 360 in the gravity direction. The plurality of second cyclones 360 is disposed to wrap around some part of the first cyclone body 320 outside as shown in FIGS. 12 and 13. The lower portion of each of the second cyclones 360 is in contact with the first cyclone 310. In the multi-cyclone dust collector 3 according to this embodiment, 8 second cyclones 360 are disposed along the first cyclone body 320 in a substantially letter C shape.

Each of the plurality of second cyclones 360 includes a cyclone body 361 and an air-discharging pipe 366. The second cyclone body 361 is formed in a substantially conical shape that has a diameter thereof decreasing from a bottom end to a top end with opened opposite ends. The air-discharging pipe 366 is disposed on a center of the second cyclone body 361 in a substantially hollow cylindrical shape.

An under cover 390 is disposed on the bottom ends of the first cyclone 310 and the plurality of second cyclones 360. The semi-clean air, which is discharged through the air communicating member 340 of the first cyclone 310, is distributed by the plurality of air passages 393 on the under cover 390 and then enters into each of the plurality of second cyclones 360. Since the structure and function of the under cover 390 is similar to the under cover 90 of the multi-cyclone dust collector 1 according to first embodiment described above, a detailed description thereof is not repeated for conciseness.

Each of the plurality of second dust collecting chambers 370 wraps around two nearby second cyclones 360 so as to collect contaminants that are discharged from a top end of each of the two nearby second cyclones 360. In other words, each of second dust collecting chambers 370 is formed as a space between a small dust wall 371 wrapping around the two nearby second cyclones 360 and a circumferential surface of each of the two nearby second cyclones 360. Accordingly, the small dust wall 371 forms a circumferential surface of each of the second dust collecting chambers 370. Some part of the small dust wall 371 may share with some part of the first cyclone body 320. For example, some part 320a of the first cyclone body 320 forms some part of the small dust wall 371 as shown in FIG. 13. Preferably, the lower portion of the second cyclone 360 is projected to the first dust collecting chamber 330 through the small dust wall 371. Also, the height of the small dust wall 371 is higher than the height of the second cyclone 360. Accordingly, contaminants discharged from the top end of the second cyclone 360 are collected in the second dust collecting chamber 370. The multi-cyclone dust collector 3 according to this embodiment has 8 second cyclones 360 and 4 second dust collecting chambers 370. Preferably, the 4 second dust collecting chambers 370 are disposed apart from each other. Then, contaminants discharged from the first cyclone 310 are collected in the first dust collecting chamber 330 through a place 374 that the plurality of second cyclones 360 is not disposed and gaps 375 between the plurality of second cyclones 360. A lower portion 361a of a second cyclone 360 that forms a lower portion of a second dust collecting chamber 370 may be in contact with a lower portion 361a of a second cyclone 360 that forms a lower portion of the next second dust collecting chamber 370.

The upper cover 380 covers top ends of the first dust collecting chamber 330 and the plurality of second dust collecting chambers 370. Since the structure and function of the upper cover 380 is similar to the upper cover 80 of the multi-cyclone dust collector 1 according to first embodiment described above, a detailed description thereof is not repeated for conciseness. Furthermore, the outer wall 331 is preferably made of transparent material for a user to recognize the amount of contaminants collected in the first dust collecting chamber 330 without opening the upper cover 380.

Operation of the multi-cyclone dust collector 3 for a vacuum cleaner according to third embodiment of the present invention is the substantially same as that of the multi-cyclone dust collector 1 for a vacuum cleaner according to first embodiment described above, except that contaminants separated in the first cyclone 310 are collected in the first dust collecting chamber 330 through the place 374 and gaps 375 between the plurality of second dust collecting chambers 370, and contaminants discharged from the plurality of second cyclones 360 are collected in the plurality of second dust collecting chambers 370. Therefore, a detailed description thereof is not repeated for conciseness.

Figure 14:
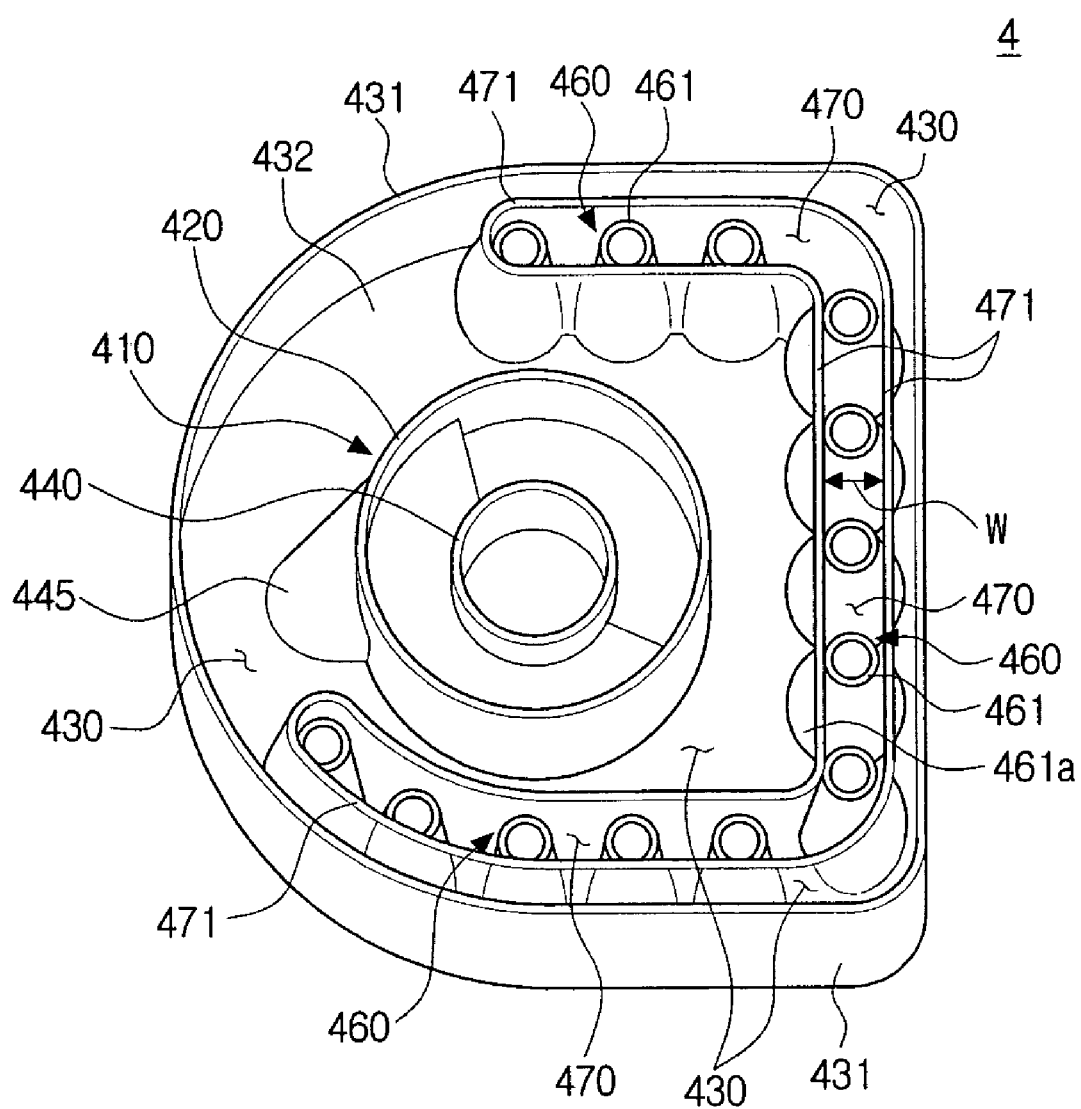
FIG. 14 is a perspective view illustrating a multi-cyclone dust collector for a vacuum cleaner according to a fourth embodiment of the present invention without an upper cover.

FIG. 14 shows a multi-cyclone dust collector 4 for a vacuum cleaner according to a fourth embodiment of the present invention. FIG. 14 is a perspective view illustrating a multi-cyclone dust collector according to the fourth embodiment without an upper cover.

Referring to FIG. 14, a multi-cyclone dust collector 4 for a vacuum cleaner according to the fourth embodiment of the present invention includes a first cyclone 410, a first dust collecting chamber 430, a plurality of second cyclones 460, and a second dust collecting chamber 470.

The first cyclone 410 is disposed at a substantially center of the multi-cyclone dust collector 4, and sucks contaminants-laden air, which are sucked through a suction brush 110, into a lower portion of the first cyclone 410 in a direction opposite to the gravity direction. The first cyclone 410 forces the sucked contaminants-laden air to whirl upwardly inside the first cyclone 410 so as to separate contaminants from the contaminants-laden air by centrifugal force. The separated contaminants move in a direction opposite to the gravity direction and are discharged over a top end of the first cyclone 410. Then, the first cyclone 410 discharges air having contaminants removed in the gravity direction. The first cyclone 410 includes a first cyclone body 420, an air communicating member 440, and an air suction pipe 445. Since the structure and function of the first cyclone body 420, the air communicating member 440, and the air suction pipe 445 of the multi-cyclone dust collector 4 according to the present embodiment are the substantially same as those of the multi-cyclone dust collector 1 according to the first embodiment of the present invention, a detail description thereof is not repeated for conciseness.

The first dust collecting chamber 430 is disposed at a side of the first cyclone 410, and collects contaminants that are separated in the first cyclone 410 by centrifugal force and are discharged through the opened top end of the first cyclone 410. The first dust collecting chamber 430 wraps entirely around the first cyclone 410, the plurality of second cyclones 460, and the second dust collecting chamber 470. In other words, the first dust collecting chamber 430 is formed as a space between an outer wall 431 that wraps around the first cyclone 410 and the second dust collecting chamber 470 at a predetermined distance, a dust wall 471 forming the second dust collecting chamber 470, and a circumferential surface of the first cyclone 410. A bottom end of the first dust collecting chamber 430 is closed by a bottom plate 432. The first dust collecting chamber 430 is opened with respect to whole circumference of the first cyclone body 420 so that the first dust collecting chamber 430 can collect contaminants discharged over the top end of the first cyclone body 420. Here, the shape of the outer wall 431 and the bottom plate 432 of the first dust collecting chamber 430 as shown in FIG. 14 is only one example, it goes without saying that the outer wall 431 and the bottom plate 432 of the first dust collecting chamber 430 can be variously shaped.

The second cyclone 460 takes semi-clean air that is discharged from the first cyclone 410, and forces the semi-clean air to enter into the lower portion of the second cyclone 460 and to whirl upwardly so that fine contaminants remained in the semi-clean air are separated and discharged in a direction opposite to the gravity direction by centrifugal force operating upon the whirling semi-clean air. Then, clean air is discharged in the gravity direction.

Referring to FIG. 14, the plurality of second cyclones 460 is disposed to wrap around some part of the first cyclone 410. Each of the plurality of second cyclones 460 sucks the semi-clean air, which is discharged from the first cyclone 410 in the gravity direction, into the lower portion of the second cyclone 460, and then, forms the sucked semi-clean air an upwardly whirling air current. Fine contaminants remained in the semi-clean air are separated and discharged in a direction opposite to the gravity direction by centrifugal force operating upon the upwardly whirling air current. Clean air is discharged from the second cyclone 460 in the gravity direction. At this time, the plurality of second cyclones 460 is disposed in a curved line to wrap around some part of the first cyclone body 420 apart from the first cyclone body 420 as shown in FIGS. 14. Preferably, the lower portion 461a of one of the second cyclone bodies 461 abuts on the lower portion 461a of the next second cyclone body 461. In this embodiment, 13 second cyclones 460 are disposed at a side of the first cyclone body 420 in a substantially flattened U shape to wrap around the first cyclone body 420. Since the structure and function of each of the plurality of second cyclones 460 is similar to that of the second cyclone 360 of the multi-cyclone dust collector 3 according to the third embodiment described above, a detailed description thereof is not repeated for conciseness.

An under cover (not shown) is disposed on the bottom ends of the first cyclone 410 and the plurality of second cyclones 460. Accordingly, the semi-clean air, which is discharged through the air communicating member 440 of the first cyclone 410, is distributed by a plurality of air passages on the under cover and then is entered into each of the plurality of second cyclones 460. Since the structure and function of the under cover is similar to the under cover 90 of the multi-cyclone dust collector 1 according to first embodiment described above, a detailed description thereof is not repeated for conciseness.

The second dust collecting chamber 470 wraps around all the plurality of second cyclones 460 so as to collect contaminants that are discharged from a top end of each of the plurality of second cyclones 460. In other words, the second dust collecting chamber 470 is formed as a space between a dust wall 471 wrapping around all the plurality of second cyclones 460 and a circumferential surface of each of the plurality of second cyclones 460. Also, the height of the dust wall 471 is higher than the height of the second cyclone 460. Accordingly, contaminants discharged from the top end of the second cyclone 460 are collected in the second dust collecting chamber 470. The multi-cyclone dust collector 4 according to this embodiment has the second dust collecting chamber 470 that is formed by the dust wall 471 wrapping around 13 second cyclones 460. The dust wall 471 forms a circumferential surface of the second dust collecting chamber 470 and is spaced apart from the first cyclone body 420 and the outer wall 431 of the first dust collecting chamber 430. Therefore, contaminants that are separated in the first cyclone body 420 are discharged to the first dust collecting chamber 430 through the entire circumference of the top end of the first cyclone body 420. Accordingly, a discharging space that contaminants are discharged from the first cyclone 410 to the first dust collecting chamber 430 becomes larger in order of the multi-cyclone dust collector 1, 3, and 4 according to first, third, and fourth embodiment of the present invention. In other words, a discharging space of the multi-cyclone dust collector 4 of the fourth embodiment is larger than a discharging space of the multi-cyclone dust collector 3 of the third embodiment. The discharging space of the multi-cyclone dust collector 3 of the third embodiment is larger than a discharging space of the multi-cyclone dust collector 1 of the first embodiment. Furthermore, a volume of the second dust collecting chamber 470 may be determined by adjusting the interval W between parts of the dust wall 471 to face each other. Preferably, the interval W between the parts of dust wall 471 to face each other is determined such that the parts of dust wall 471 to face each other are in contact with the top end of the second cyclone 460 as shown in FIG. 14. The lower portion 461a of each of the plurality of second cyclones 460 is projected to the first dust collecting chamber 430 through the dust wall 471.

The upper cover (not shown) covers top ends of the first dust collecting chamber 430 and the second dust collecting chamber 470. Since the structure and function of the upper cover is similar to the upper cover 80 of the multi-cyclone dust collector 1 according to first embodiment described above, a detailed description thereof is not repeated for conciseness. However, a sealing member (not shown) that prevents the first dust collecting chamber 430 from being in fluid communication with the second dust collecting chamber 470 is different in a shape from the sealing member 81 of the multi-cyclone dust collector 1 according to first embodiment. Furthermore, the outer wall 431 is preferably made of transparent material for a user to recognize the amount of contaminants collected in the first dust collecting chamber 430 without opening the upper cover.

Operation of the multi-cyclone dust collector 4 for a vacuum cleaner according to the fourth embodiment of the present invention is substantially same as that of the multi-cyclone dust collector 1 for a vacuum cleaner according to first embodiment described above, except that contaminants separated in the first cyclone 410 are discharged to the first dust collecting chamber 430 through the whole circumference of the top end of the first cyclone body 420. Therefore, a detailed description thereof is not repeated for conciseness.

Hereinafter, as another aspect of the present invention, an example of a vacuum cleaner 100 employing the multi-cyclone dust collector 101 according to an embodiment of the present invention described above will be explained.

Figure 15:
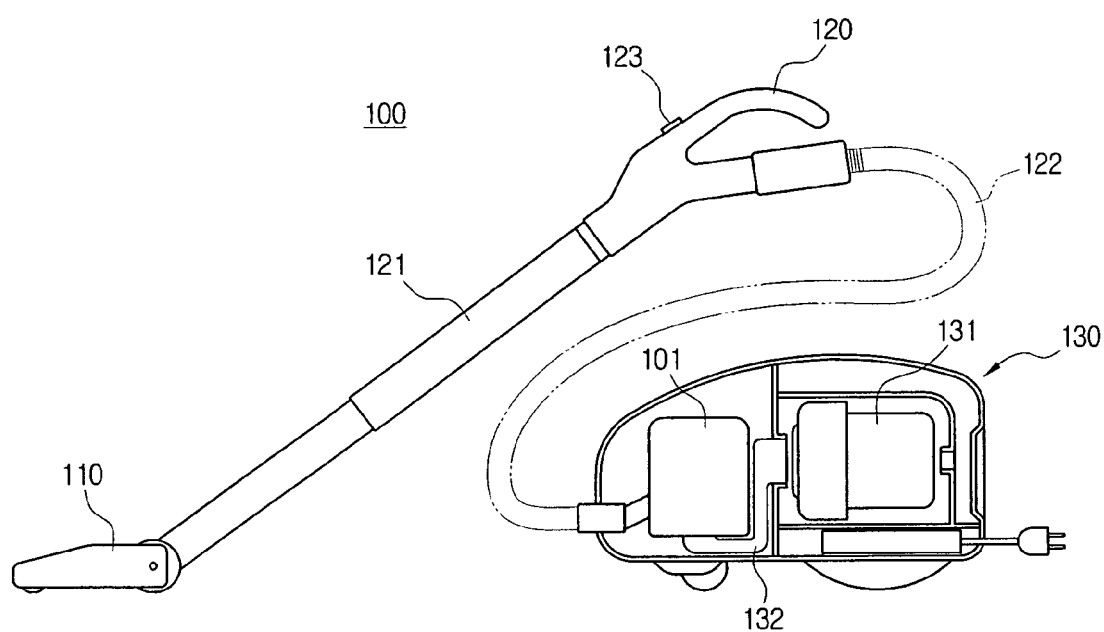
FIG. 15 is a view illustrating a vacuum cleaner employing a multi-cyclone dust collector according to an embodiment of the present invention.

Referring to FIG. 15, a vacuum cleaner 100 according to an embodiment of the present invention includes a suction brush 110, an extension pipe 121, a flexible hose 122, and a cleaner body 130.

The suction brush 110 is provided with a dust suction port facing a cleaning surface for sucking in contaminants-laden air.

The extension pipe 121 and the flexible hose 122 allow the suction brush 110 in fluid communication with the cleaner body 130. A handle 120 is disposed on an upper portion of the extension pipe 121. The handle 120 generally has a power switch 123 for turning on the vacuum cleaner 100.

The vacuum generator 131 and the multi-cyclone dust collector 101 are disposed in the cleaner body 130. The vacuum generator 131 generates suction force to suck contaminants-laden air through the suction brush 110, and is in fluid communication with the multi-cyclone dust collector 101 via a piping member 132. The multi-cyclone dust collector 101 separates contaminants from contaminants-laden air sucked from the suction brush 110 and collects the separated contaminants therein. The multi-cyclone dust collector 101 includes a first cyclone that forces the contaminants-laden air to form a first upwardly whirling air current so as to separate relatively large contaminants, a first dust collecting chamber that collects contaminants discharged from the first cyclone, and a second cyclone unit that forms air discharged from the first cyclone into a second upwardly whirling air current so as to separate and collect fine contaminants. The structure and operation of the multi-cyclone dust collector 101 is the substantially same as that of the multi-cyclone dust collector 1,2,3, and 4 according to anyone of the first to fourth embodiments of the present invention described above; a detailed description thereof is not repeated for conciseness.

Therefore, upon turning on the power switch 123 of the vacuum cleaner 100 and then moving the suction brush 110 on a cleaning surface, contaminants on the cleaning surface are sucked into the dust suction port of the suction brush 110 by suction force of the vacuum generator 131. Contaminants-laden air sucked into the suction brush 110 flows to the multi-cyclone dust collector 101 through the extension pipe 121 and the flexible hose 122. Contaminants entering the multi-cyclone dust collector 101 are separated by the first and second cyclone 10 and 60 (see FIG. 4). Clean air having contaminants removed is discharged out of the cleaner body 130.

In the above description, a canister type vacuum cleaner is used as an example of vacuum cleaners employing the multi-cyclone dust collector according to an embodiment of the present invention; however, this should not be considered as limiting. Various types of vacuum cleaners such as an upright type vacuum cleaner may employ the multi-cyclone dust collector according to an embodiment of the present invention.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A multi-cyclone dust collector for a vacuum cleaner comprising:
    at least one first cyclone having a lower portion, the at least one first cyclone forcing contaminants-laden air that enters the lower portion to whirl so as to centrifugally separate contaminants from the contaminants-laden air, the at least one first cyclone discharging semi-clean air; and
    at least one second cyclone being disposed around the at least one first cyclone, the at least one second cyclone having a second lower portion, the at least one second cyclone forcing the semi-clean air that enters into the second lower portion to whirl so as to centrifugally separate fine contaminants from the semi-clean air, the at least one second cyclone discharging clean air.

2. The multi-cyclone dust collector of claim 1, wherein the at least one second cyclone is smaller in size than the at least one first cyclone.

3. The multi-cyclone dust collector of claim 1, wherein the at least one first cyclone discharges the semi-clean air in the gravity direction and the at least one second cyclone discharges the clean air in the gravity direction.

4. The multi-cyclone dust collector of claim 3, wherein a place through which the contaminants-laden air is discharged from the at least one first cyclone and a second place through which the semi-clean air enters the at least one second cyclone are on a same plane.

5. The multi-cyclone dust collector of claim 1, wherein the at least one first cyclone discharges the contaminants in a direction opposite to the gravity direction.

6. The multi-cyclone dust collector of claim 5, further comprising:
    a first dust collecting chamber being disposed around the at least one first cyclone, the first dust collecting chamber collecting the contaminants discharged from the at least one first cyclone.

7. The multi-cyclone dust collector of claim 6, wherein the at least one second cyclone is disposed inside the first dust collecting chamber.

8. The multi-cyclone dust collector of claim 6, wherein the at least one first cyclone has a height that is lower than a height of the first dust collecting chamber.

9. The multi-cyclone dust collector of claim 1, wherein the at least one first cyclone has a place through which the contaminants are discharged that is higher than a place through which the contaminants-laden air enters, and the at least one second cyclone has a place through which the fine contaminants are discharged that is higher than a place through which the semi-clean air enters.

10. The multi-cyclone dust collector of claim 1, wherein the at least one first cyclone has a place through which the contaminants are discharged that is higher than a place through which the semi-clean air is discharged, and the at least one second cyclone has a place through which the fine contaminants are discharged that is higher than a place through which the clean air is discharged.

11. The multi-cyclone dust collector of claim 1, wherein the at least one second cyclone discharges the fine contaminants in a direction opposite to the gravity direction.

12. The multi-cyclone dust collector of claim 11, further comprising:
    a second dust collecting chamber being disposed at a side of the at least one second cyclone, the second dust collecting chamber collecting the fine contaminants discharged from the at least one second cyclone.

13. The multi-cyclone dust collector of claim 11, wherein the at least one second cyclone comprises:
    a plurality of second cyclones; and
    a plurality of second dust collecting chambers wrapping around at least one of the plurality of second cyclones, the plurality of second dust collecting chambers collecting the fine contaminants discharged from the at least one of the plurality of second cyclones.

14. The multi-cyclone dust collector of claim 13, wherein each of the plurality of second dust collecting chambers is formed to wrap around two nearby second cyclones so as to collect the fine contaminants discharged from the two nearby second cyclones.

15. The multi-cyclone dust collector of claim 13, wherein the second dust collecting chamber wraps around all the plurality of second cyclones so as to collect the fine contaminants discharged from the plurality of second cyclones.

16. The multi-cyclone dust collector of claim 1, wherein a part of the at least one first cyclone forms a part of the at least one second cyclone.

17. The multi-cyclone dust collector of claim 1, wherein the at least one second cyclone is in a substantially conical shape, and a part of the first cyclone forms a side surface of the lower portion of the at least one second cyclone.

18. A multi-cyclone dust collector for a vacuum cleaner, comprising:
a first cyclone sucking contaminants-laden air into a lower portion of the first cyclone, the first cyclone forcing the contaminants-laden air to form a first upwardly whirling air current so as to centrifugally separate the contaminants from the contaminants-laden air;
a first dust collecting chamber being disposed to wrap around at least a portion of the first cyclone, the first dust collecting chamber collecting the contaminants discharged from the first cyclone; and
a plurality of second cyclones being disposed around the first cyclone, the plurality of second cyclones sucking semi-clean air that is discharged from the first cyclone into a lower portion of each of the second cyclones, the plurality of second cyclones forcing the semi-clean air to form a second upwardly whirling air current so as to centrifugally separate fine contaminants from the semi-clean air.

19. The multi-cyclone dust collector of claim 18, wherein the first cyclone comprises:
a first cyclone body having a substantially hollow cylindrical shape, the first cyclone body forcing the entering contaminants-laden air to whirl inside the first cyclone body;
an air communicating member being disposed inside the first cyclone body, the air communicating member discharging the semi-clean air having the contaminants removed; and
an air suction pipe being disposed at a bottom surface of the first cyclone body, the air suction pipe forcing the entering contaminants-laden air to form a first upwardly whirling air current.

20. The multi-cyclone dust collector of claim 19, wherein the air communicating member is formed in a substantially hollow cylindrical shape, the air communicating member having an opened top end and a bottom end that is in fluid communication with a plurality of air passages corresponding to the plurality of second cyclones.

21. The multi-cyclone dust collector of claim 20, further comprising a guiding cone being disposed at a center of the bottom end of the air communicating member.

22. The multi-cyclone dust collector of claim 19, further comprising a second dust collecting chamber being formed to wrap around all the plurality of second cyclones, the second dust collecting chamber collecting the contaminants discharged from the plurality of second cyclones.

23. The multi-cyclone dust collector of claim 22, wherein the plurality of second cyclones is in contact with the first cyclone body.

24. The multi-cyclone dust collector of claim 23, wherein the second dust collecting chamber is formed as a space between the first cyclone body and an inner wall that wraps around all the plurality of second cyclones.

25. The multi-cyclone dust collector of claim 24, wherein the first dust collecting chamber is formed as a space between an outer wall wrapping entirely around the inner wall and the first cyclone body, the inner wall, and a part of the first cyclone body that is not wrapped around by the inner wall.

26. The multi-cyclone dust collector of claim 19, further comprising a plurality of second dust collecting chambers being formed to wrap around at least one of the plurality of second cyclones.

27. The multi-cyclone dust collector of claim 26, further comprising gaps formed between the plurality of second dust collecting chambers through which the contaminants discharged from the first cyclone can pass.

28. The multi-cyclone dust collector of claim 22, wherein the plurality of second cyclones is spaced apart from the first cyclone body.

29. The multi-cyclone dust collector of claim 28, wherein the second dust collecting chamber is formed as a space between the plurality of second cyclones and a dust wall that wraps around all the plurality of second cyclones.

30. The multi-cyclone dust collector of claim 29, wherein the dust wall is in contact with each of the plurality of second cyclones.

31. The multi-cyclone dust collector of claim 22, further comprising an upper cover detachably covering the top ends of the first cyclone, the first dust collecting chamber, and the second dust collecting chamber.

32. The multi-cyclone dust collector of claim 31, further comprising:
a backflow preventing dam being disposed on a bottom surface of the upper cover, the backflow preventing dam preventing contaminants collected in the first dust collecting chamber from flowing back into the first cyclone body.

33. A multi-cyclone dust collector for a vacuum cleaner, comprising:
a first cyclone forcing contaminants-laden air, to enter into a lower portion of the first cyclone and to form a first upwardly whirling air current so as to centrifugally separate contaminants from the contaminants-laden air;
a plurality of second cyclones being disposed around a portion of the first cyclone, each of the second cyclones sucking semi-clean air that is discharged from the first cyclone into a lower portion of each of the second cyclones, each of the second cyclones forcing the semi-clean air to form a second upwardly whirling air current so as to centrifugally separate fine contaminants from the air; and
a first dust collecting chamber being disposed to wrap around the first cyclone and the plurality of second cyclones, the first dust collecting chamber collecting contaminants discharged from the first cyclone.

34. The multi-cyclone dust collector of claim 33, wherein the first cyclone includes a plurality of cyclones.

35. The multi-cyclone dust collector of claim 33, wherein each of the plurality of second cyclones includes a second cyclone body, and a top end of the second cyclone body is inclined toward the first cyclone with respect to a bottom end of the second cyclone body.

36. The multi-cyclone dust collector of claim 35, wherein at least one of the second cyclones is formed such that at least a portion of the circumferential surface thereof is projected into the first dust collecting chamber.

37. A multi-cyclone dust collector for a vacuum cleaner, comprising:
at least one first cyclone sucking contaminants-laden air so as to centrifugally separate contaminants from the contaminants-laden air;
at least one second cyclone being disposed around the at least one first cyclone, the at least one second cyclone sucking semi-clean air that is discharged from the at least one first cyclone so as to centrifugally separate fine contaminants from the semi-clean air;
a second dust collecting chamber wrapping around the at least one second cyclone, so as to collect the fine contaminants discharged from the at least one second cyclone in a direction opposite to the gravity direction; and a first dust collecting chamber wrapping around the at least one first cyclone and the second dust collecting chamber, so as to collect the contaminants discharged from the at least one first cyclone.

38. The multi-cyclone dust collector of claim 37, wherein the at least one first cyclone forces the contaminants-laden air that is sucked into a bottom surface thereof to whirl upwardly, the at least one first cyclone discharging the contaminants separated from the contaminants-laden air into the first dust collecting chamber through an opened top end of the at least one first cyclone, the at least one first cyclone discharging the semi-clean air in the gravity direction.

39. The multi-cyclone dust collector of claim 37, wherein the at least one second cyclone forces the semi-clean air discharged from the at least one first cyclone and sucked into a lower portion of the at least one second cyclone to whirl upwardly, the at least one second cyclone discharging the fine contaminants separated from the semi-clean air into the second dust collecting chamber through an opened top end of the at least one second cyclone, the at least one second cyclone discharging clean air in the gravity direction.

40. A multi-cyclone dust collector for a vacuum cleaner, comprising:

at least one first cyclone sucking contaminants-laden air so as to separate contaminants, a first dust collecting chamber collecting the contaminants separated by the at least one first cyclone, at least one second cyclone re-separating centrifugally semi-clean air discharged from the at least one first cyclone, and a second dust collecting chamber collecting fine contaminants separated by the at least one second cyclone, wherein the second dust collecting chamber wraps around at least a portion of a circumferential surface of the at least one first cyclone, and the first dust collecting chamber wraps around a circumferential surface of the second dust collecting chamber and at least a portion of the circumferential surface of the at least one first cyclone.

41. The multi-cyclone dust collector of claim 40, wherein the at least one first cyclone is on a center of the multi-cyclone dust collector.

42. The multi-cyclone dust collector of claim 40, wherein the at least one first cyclone discharges the contaminants in a direction opposite to the gravity direction and the at least one second cyclone discharges the fine contaminants in a direction opposite to the gravity direction.

43. The multi-cyclone dust collector of claim 40, wherein the at least one first cyclone sucks the contaminants-laden air into a lower portion and discharges the semi-clean air through the lower portion and wherein the at least one second cyclone sucks the semi-clean air into a second lower portion and then discharges clean air through the second lower portion.

44. A method of collecting contaminants for a multi-cyclone dust collector, comprising:

sucking contaminants-laden air into a lower portion of a first cyclone so as to form the contaminants-laden air into a first upwardly whirling air current inside the first cyclone;

separating contaminants from the contaminants-laden air by centrifugal force so as to discharge the contaminants from the first cyclone in a direction opposite to the gravity direction;

discharging semi-clean air from the first cyclone in the gravity direction;

sucking the semi-clean air into a second lower portion of a second cyclone so as to form the semi-clean air into a second upwardly whirling air current inside the second cyclone;

separating fine contaminants from the air by centrifugal force so as to discharge the fine contaminants from the second cyclone in a direction opposite to the gravity direction; and discharging clean air from the second cyclone in the gravity direction.

* * * * *